US012080310B2

(12) United States Patent
Disch et al.

(10) Patent No.: US 12,080,310 B2
(45) **Date of Patent: *Sep. 3, 2024**

(54) AUDIO ENCODER AND DECODER USING A FREQUENCY DOMAIN PROCESSOR WITH FULL-BAND GAP FILLING AND A TIME DOMAIN PROCESSOR

(71) Applicant: Fraunhofer-Gesellschaft zur Förderung der angewandten Forschung e.V., Munich (DE)

(72) Inventors: Sascha Disch, Fürth (DE); Martin Dietz, Nuremberg (DE); Markus Multrus, Nuremberg (DE); Guillaume Fuchs, Bubenreuth (DE); Emmanuel Ravelli, Erlangen (DE); Matthias Neusinger, Rohr (DE); Markus Schnell, Nuremberg (DE); Benjamin Schubert, Nuremberg (DE); Bernhard Grill, Rückersdorf (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,132

(22) Filed: Jun. 1, 2021

(65) Prior Publication Data

US 2021/0287689 A1 Sep. 16, 2021

Related U.S. Application Data

(63) Continuation of application No. 16/286,397, filed on Feb. 26, 2019, now Pat. No. 11,049,508, which is a (Continued)

(30) Foreign Application Priority Data

Jul. 28, 2014 (EP) .................................... 14178817

(51) Int. Cl.
*G10L 19/18* (2013.01)
*G10L 19/02* (2013.01)
(Continued)

(52) U.S. Cl.
CPC ............ *G10L 19/18* (2013.01); *G10L 19/028* (2013.01); *G10L 19/032* (2013.01); *G10L 19/06* (2013.01);
(Continued)

(58) Field of Classification Search
CPC ..... G10L 19/18; G10L 19/028; G10L 19/032; G10L 19/06; G10L 19/265; G10L 19/02;
(Continued)

(56) References Cited

U.S. PATENT DOCUMENTS 6,134,518 A 10/2000 Cohen et al.
6,968,564 B1 11/2005 Srinivasan
(Continued)

FOREIGN PATENT DOCUMENTS

AU 2013200680 A1 2/2013
CN 1677490 A 10/2005
(Continued)

OTHER PUBLICATIONS

Oh et al., Enhanced Long-Term Predictor for Unifed Speech and Audio Coding, 2011, IEEE. whole document (Year: 2011).*
(Continued)

*Primary Examiner* — Sonia L Gay
(74) *Attorney, Agent, or Firm* — Haynes and Boone, LLP

(57) ABSTRACT

An audio encoder for encoding an audio signal has: a first encoding processor for encoding a first audio signal portion in a frequency domain, having: a time frequency converter for converting the first audio signal portion into a frequency domain representation; an analyzer for analyzing the frequency domain representation to determine first spectral
(Continued)

portions to be encoded with a first spectral resolution and second regions to be encoded with a second resolution; and a spectral encoder for encoding the first spectral portions with the first spectral resolution and encoding the second portions with the second resolution; a second encoding processor for encoding a second different audio signal portion in the time domain; a controller for analyzing and determining, which portion of the audio signal is the first audio signal portion encoded in the frequency domain and which portion is the second audio signal portion encoded in the time domain; and an encoded signal former for forming an encoded audio signal having a first encoded signal portion for the first audio signal portion and a second encoded signal portion for the second portion.

18 Claims, 22 Drawing Sheets

Related U.S. Application Data continuation of application No. 15/414,427, filed on Jan. 24, 2017, now Pat. No. 10,332,535, which is a continuation of application No. PCT/EP2015/067003, filed on Jul. 24, 2015.

(51) Int. Cl.
*G10L 19/028* (2013.01)
*G10L 19/032* (2013.01)
*G10L 19/04* (2013.01)
*G10L 19/06* (2013.01)
*G10L 19/20* (2013.01)
*G10L 19/24* (2013.01)
*G10L 19/26* (2013.01)
*G10L 21/038* (2013.01)

(52) U.S. Cl.
CPC ............ *G10L 19/265* (2013.01); *G10L 19/02* (2013.01); *G10L 19/04* (2013.01); *G10L 19/20* (2013.01); *G10L 19/24* (2013.01); *G10L 21/038* (2013.01)

(58) Field of Classification Search
CPC ......... G10L 19/04; G10L 19/20; G10L 19/24; G10L 21/038
See application file for complete search history.

(56) References Cited

U.S. PATENT DOCUMENTS 7,388,525 B2 6/2008 Miyauchi et al.
7,596,486 B2 9/2009 Ojala et al.
7,860,709 B2 12/2010 Makinen
7,873,511 B2 1/2011 Herre et al.
8,015,017 B2 9/2011 Sung et al.
8,271,274 B2 9/2012 Massaloux et al.
10,043,525 B2* 8/2018 Kaniewska .............. B41K 1/40
2002/0173969 A1 11/2002 Ojanpera
2003/0093278 A1* 5/2003 Malah ................... G10L 21/038 704/265
2003/0233234 A1 12/2003 Truman et al.
2004/0049376 A1 3/2004 Sperschneider et al.
2005/0004793 A1* 1/2005 Ojala ...................... G10L 19/24 704/219
2005/0027516 A1* 2/2005 Lee ....................... G10L 21/038 704/219
2005/0256701 A1 11/2005 Makinen
2008/0137874 A1 6/2008 Christoph
2008/0228500 A1 9/2008 Oh et al.
2009/0213958 A1 8/2009 Kondo et al.
2009/0240491 A1 9/2009 Reznik
2010/0017453 A1 7/2010 Bernard
2010/0174531 A1* 7/2010 Bernard Vos ......... G10L 19/038 704/E21.001
2010/0262420 A1 10/2010 Herre et al.
2010/0324912 A1 12/2010 Choo et al.
2011/0173008 A1 7/2011 Lecomte et al.
2011/0173010 A1 7/2011 Lecomte et al.
2011/0200198 A1* 8/2011 Grill ....................... G10L 19/18 381/23
2011/0202353 A1* 8/2011 Neuendorf ........... G10L 21/038 704/500
2011/0218797 A1* 9/2011 Mittal ..................... G10L 19/20 704/200
2011/0238425 A1 9/2011 Neuendorf et al.
2011/0320196 A1 12/2011 Choo et al.
2011/0320212 A1* 12/2011 Tsujino ................... G10L 19/20 704/500
2012/0016667 A1 1/2012 Gao
2012/0016668 A1 1/2012 Gao
2012/0076323 A1 3/2012 Disch et al.
2012/0209600 A1 8/2012 Kim et al.
2012/0221342 A1 8/2012 Oshikiri
2012/0245947 A1* 9/2012 Neuendorf ............. G10L 19/20 704/500
2012/0253797 A1* 10/2012 Geiger .................. G10L 19/083 704/219
2012/0271644 A1 10/2012 Bessette et al.
2012/0328124 A1 12/2012 Kjoerling
2013/0006645 A1 1/2013 Jiang et al.
2013/0030798 A1 1/2013 Mittal et al.
2013/0030819 A1 1/2013 Purnhagen et al.
2013/0090933 A1* 4/2013 Villemoes ............ G10L 21/038 704/500
2013/0159005 A1 6/2013 Kikuirl et al.
2013/0173259 A1 7/2013 Mittal et al.
2013/0226570 A1 8/2013 Multrus et al.
2013/0253917 A1 9/2013 Schildbach
2013/0282368 A1* 10/2013 Choo .................... G10L 19/038 704/219
2013/0315082 A1 11/2013 Yan et al.
2014/0046670 A1 2/2014 Moon et al.
2014/0081629 A1 3/2014 Gao
2016/0050420 A1 2/2016 Helmrich et al.
2016/0293173 A1* 10/2016 Faure .................... G10L 19/022
2017/0133023 A1 5/2017 Disch et al.
2017/0270937 A1 9/2017 Nagel et al.

FOREIGN PATENT DOCUMENTS

CN 1954367 A 4/2007
CN 101199121 A 6/2008
CN 101221766 A 7/2008
CN 101501763 A 8/2009
CN 101872618 A 10/2010
CN 102089758 A 6/2011
CN 102113051 A 6/2011
CN 102150205 A 8/2011
CN 102177543 A 9/2011
CN 102543090 A 7/2012
CN 102648494 A 8/2012
CN 103493131 A 1/2014
CN 103905834 A 7/2014
EP 0653846 A1 5/1995
EP 1575032 A2 9/2005
EP 1990799 A1 11/2008
EP 2405426 A1 1/2011
EP 2343700 A1 7/2011
EP 2613316 A2 7/2013
JP H09-319396 A 12/1997
JP 2002-050967 A 2/2002
JP 2005-107255 A 4/2005
JP 2008-503783 A 2/2008
JP 2010-526346 A 7/2010
JP 2010-210680 A 9/2010
JP 2012-242785 A 12/2012
JP 2013-543600 A 12/2013
JP 2014-505902 A 3/2014
KR 20050123396 A 12/2005

(56) References Cited

FOREIGN PATENT DOCUMENTS

| | | | |
|---|---|---|---|
| RU | 2439721 | C2 | 7/2011 |
| RU | 2437172 | C1 | 12/2011 |
| RU | 2515704 | C2 | 8/2012 |
| RU | 2577195 | C2 | 5/2014 |
| TW | 200809771 | A | 2/2008 |
| TW | 200828826 | A | 7/2008 |
| TW | I321777 | B | 3/2010 |
| WO | WO 2009029037 | A1 | 3/2009 |
| WO | WO 2011048117 | A | 4/2011 |
| WO | WO 2011048117 | A1 | 4/2011 |
| WO | WO 2012091464 | A1 | 7/2012 |
| WO | WO 2014/199632 | A1 | 12/2014 |
| WO | WO 2015/010948 | A1 | 1/2015 |

OTHER PUBLICATIONS

Brinker et al., An Overview of the Coding Standard MPEG-4Audio Amendments 1 and 2: HE-AAC, SSC and HE-AACv2, 2009, Hindawi, whole document (Year: 2009).*

Decision to Grant a Patent dated Aug. 10, 2021 issued in the parallel Japanese patent application No. 2019-117964 (5 pages with English translation).

Office Action dated Jun. 1, 2021 issued in related U.S. Appl. No. 16/290,587 (33 pages).

Office Action dated Mar. 10, 2020 issued in the parallel Japanese patent application No. 2019-024181 (10 pages).

Office Action dated Mar. 12, 2020 issued in the parallel European patent application No. 19160134.3 (7 pages).

Notice of Allowance dated May 14, 2019 issued in the parallel Korean patent application No. 10-2017-7005432 (8 pages with English translation).

Notice of Allowance dated May 14, 2019 issued in the parallel Korean patent application No. 10-2017-7005491 (8 pages with English translation).

Ronald E. Crochiere, et al. Optimum FIR digital filter implementations for decimation, interpolation, and narrow-band filtering. IEEE Transactions on Acoustics, Speech, and Signal Processing, Oct. 1975.

Audio codec processing functions, Extended Adaptive Multi-Rate—Wideband (AMR-WB+) codec. 3GPP TS 26.290 version 9.0.0 Release 9, Sep. 2009.

ISO/IEC FDIS 23003-3:2011(E), Information technology—MPEG audio technologies—Part 3: Unified speech and audio coding. ISO/IEC JTCC 1/SC 29/WG 11. Sep. 20, 2011.

Office Action dated Jul. 29, 2020 issued in the parallel U.S. Appl. No. 16/290,587 (38 pages).

Office Action dated Aug. 25, 2020 issued in the parallel Japanese patent application No. 2019-117964 (22 pages).

Office Action dated Sep. 13, 2019 issued in the parallel IN patent application No. 201637041442 (7 pages).

Hearing Notice dated Feb. 25, 2022 in the parallel Indian patent application No. 201737001634 (2 pages).

Office Action dated Oct. 26, 2020 issued in related Chinese patent app. no. 201580038795.8 (8 pages).

Dietz M. et al., "Spectral Band Replication, a novel approach in audio coding", 112th AES Convention, Munich 2002 (8 pages).

Meltzer S. et al., "SBR enhanced audio codecs for digital broadcasting such as 'Digital Radio Mondiale' (DRM)", 112th AES Convention, Munich 2002 (4 pages).

Ziegler T. et al., "Enhancing mp3 with SBR: Features and Capabilities of the new mp3PRO Algorithm", 112th AES Convention, Munich 2002 (7 pages).

Office Action dated Mar. 28, 2018 issued in parallel Russian patent application No. 2017106099 (12 pages).

Office Action dated Apr. 4, 2018 issued in related U.S. Appl. No. 15/414,289.

Office Action dated Apr. 16, 2018 issued in parallel Russian patent application No. 2017105448.

Office action dated Apr. 24, 2018 in the parallel Japanese patent application No. 2017-504786 (10 pages).

Office action Apr. 25, 2018 for the parallel Japanese patent application No. 2017-504785 (11 pages with translation).

Neuendorf, Max, WD7 of USAC, ISO/IEC JTC1/SC29/WG11, MPEG2010/N11299, Germany, Apr. 2010, P6-7, 10-13, 56, 105 (9 pages).

Office Action dated Aug. 30, 2018 issued in in the parallel Russian patent application No. 2017105448 (35 pages).

Notice of Allowance dated Oct. 31, 2018 issued in related U.S. Appl. No. 15/414,289 (18 pages).

Notice of Allowance dated Oct. 25, 2023, issued in related U.S. Appl. No. 17/453,139 (10 pgs).

Office Action dated May 17, 2023 issued in the parallel CN patent application No. 202110039148.6 (18 pages).

Office Action dated Sep. 30, 2022 issued in the parallel U.S. Appl. No. 17/336,132 (43 pages).

Office Action dated Jun. 8, 2023 issued in the parallel U.S. Appl. No. 17/453,139 (52 pages).

Oh et al., Enhanced Long-Term Predictor for Unified Speech and Audio Coding, 2011, IEEE whole document (Year: 2011).

Office Action dated Jul. 27, 2020 issued in the parallel U.S. Appl. No. 16/286,397 (37 pages).

Office Action dated Aug. 25, 2020 issued in the parallel Japanese patent application No. 2019-117964.

Office Action issued on Apr. 9, 2024 in parallel Japanese patent application No. 2023-019921 (20 pages with English translation).

European Searcch Report dated Aug. 8, 2023 issued in the parallel EP patent application 23184408.5.

Anonymous: "WD7 of USAC", 92. MPEG Meeting; Apr. 19-Apr. 23, 2010; Dresden; (Motion Picture Expert Group or ISO/IEC JTC1/SC29/WG11), No. N11299, Apr. 26, 2010 (Apr. 26, 2010), XP030018547.

Bosi M et al: "ISO/IEC MPEG-2 Advanced Audio Coding", Journal of the Audio Engineering Society, Audio Engineering Society, New York, NY, US, vol. 45, No. 10, Oct. 1, 1997 (Oct. 1, 1997), pp. 789-812, XP000730161.

Office Action in parallel Chinese patent application No. 202111184555.2 dated May 30, 2024 (20 pages).

Office Action in the parallel Chinese patent application No. 202111184409.X (10 pages).

* cited by examiner (QUANTIZER PROCESSOR)

(OTHER SPECTRAL PORTIONS)

AUDIO ENCODER AND DECODER USING A FREQUENCY DOMAIN PROCESSOR WITH FULL-BAND GAP FILLING AND A TIME DOMAIN PROCESSOR

CROSS-REFERENCE TO RELATED APPLICATIONS

This application is a continuation of co-pending U.S. application Ser. No. 16/286,397 filed Feb. 26, 2019 which is a continuation of co-pending U.S. application Ser. No. 15/414,427 filed Jan. 24, 2017 which is now U.S. Pat. No. 10,332,535 issued Jun. 25, 2019; which is a continuation of International Application No. PCT/EP2015/067003, filed Jul. 24, 2015, which is incorporated herein by reference in its entirety, and additionally claims priority from European Application No. 14178817.4, filed Jul. 28, 2014, which is also incorporated herein by reference in its entirety.

BACKGROUND OF THE INVENTION

The present invention relates to audio signal encoding and decoding and, in particular, to audio signal processing using parallel frequency domain and time domain encoder/decoder processors.

The perceptual coding of audio signals for the purpose of data reduction for efficient storage or transmission of these signals is a widely used practice. In particular when lowest bit rates are to be achieved, the employed coding leads to a reduction of audio quality that often is primarily caused by a limitation at the encoder side of the audio signal bandwidth to be transmitted. Here, typically the audio signal is low-pass filtered such that no spectral waveform content remains above a certain pre-determined cut-off frequency.

In contemporary codecs well-known methods exist for the decoder-side signal restoration through audio signal Bandwidth Extension (BWE), e.g. Spectral Band Replication (SBR) that operates in frequency domain or so-called Time Domain Bandwidth Extension (TD-BWE) being is a post-processor in speech coders that operates in time domain.

Additionally, several combined time domain/frequency domain coding concepts exist such as concepts known under the term AMR-WB+ or USAC.

All these combined time domain/coding concepts have in common that the frequency domain coder relies on bandwidth extension technologies which incur a band limitation into the input audio signal and the portion above a cross-over frequency or border frequency is encoded with a low resolution coding concept and synthesized on the decoder-side. Hence, such concepts mainly rely on a pre-processor technology on the encoder side and a corresponding post-processing functionality on the decoder-side.

Typically, the time domain encoder is selected for useful signals to be encoded in the time domain such as speech signals and the frequency domain encoder is selected for non-speech signals, music signals, etc. However, specifically for non-speech signals having prominent harmonics in the high frequency band, the known frequency domain encoders have a reduced accuracy and, therefore, a reduced audio quality due to the fact that such prominent harmonics can only be separately parametrically encoded or are eliminated at all in the encoding/decoding process.

Furthermore, concepts exist in which the time domain encoding/decoding branch additionally relies on the bandwidth extension which also parametrically encodes an upper frequency range while a lower frequency range is typically encoded using an ACELP or any other CELP related coder, for example a speech coder. This bandwidth extension functionality increases the bitrate efficiency but, on the other hand, introduces further inflexibility due to the fact that both encoding branches, i.e., the frequency domain encoding branch and the time domain encoding branch are band limited due to the bandwidth extension procedure or spectral band replication procedure operating above a certain cross-over frequency substantially lower than the maximum frequency included in the input audio signal Relevant topics in the state-of-art comprise SBR as a post-processor to waveform decoding [1-3]

MPEG-D USAC core switching [4]

MPEG-H 3D IGF [5]

The following papers and patents describe methods that are considered to constitute known technology for the application:

[1] M. Dietz, L. Liljeryd, K. Kjorling and O. Kunz, “Spectral Band Replication, a novel approach in audio coding,” in 112th AES Convention, Munich, Germany, 2002.

[2] S. Meltzer, R. Böhm and F. Henn, “SBR enhanced audio codecs for digital broadcasting such as “Digital Radio Mondiale” (DRM),” in 112th AES Convention, Munich, Germany, 2002.

[3] T. Ziegler, A. Ehret, P. Ekstrand and M. Lutzky, “Enhancing mp3 with SBR: Features and Capabilities of the new mp3PRO Algorithm,” in 112th AES Convention, Munich, Germany, 2002.

[4] MPEG-D USAC Standard.

[5] PCT/EP2014/065109.

In MPEG-D USAC, a switchable core coder is described. However, in USAC, the band-limited core is restricted to transmit a low-pass filtered signal. Therefore, certain music signals that contain prominent high frequency content e.g. full-band sweeps, triangle sounds, etc. cannot be reproduced faithfully.

SUMMARY

According to an embodiment, an audio encoder for encoding an audio signal may have: a first encoding processor for encoding a first audio signal portion in a frequency domain, wherein the first encoding processor has: a time frequency converter for converting the first audio signal portion into a frequency domain representation having spectral lines up to a maximum frequency of the first audio signal portion; an analyzer for analyzing the frequency domain representation up to the maximum frequency to determine first spectral portions to be encoded with a first spectral resolution and second spectral portions to be encoded with a second spectral resolution, the second spectral resolution being lower than the first spectral resolution, wherein the analyzer is configured to determine a first spectral portion from the first spectral portions, the first spectral portion being placed, with respect to frequency, between two second spectral portions from the second spectral portions; a spectral encoder for encoding the first spectral portions with the first spectral resolution and for encoding the second spectral portions with the second spectral resolution, wherein the spectral encoder has a parametric coder for calculating spectral envelope information having the second spectral resolution from the second spectral portions; a second encoding processor for encoding a second different audio signal portion in the time domain, wherein the second encoding processor has: a sampling rate converter for converting the second audio signal portion to a lower sampling rate representation, the lower sampling rate being lower than a sampling rate of the audio signal, wherein the lower sampling rate representation does not include the high band of the input signal; a time domain low band encoder for time domain encoding the lower sampling rate representation; and a time domain bandwidth extension encoder for parametrically encoding the high band; a controller configured for analyzing the audio signal and for determining, which portion of the audio signal is the first audio signal portion encoded in the frequency domain and which portion of the audio signal is the second audio signal portion encoded in the time domain; and an encoded signal former for forming an encoded audio signal having a first encoded signal portion for the first audio signal portion and a second encoded signal portion for the second audio signal portion.

According to another embodiment, an audio decoder for decoding an encoded audio signal may have: a first decoding processor for decoding a first encoded audio signal portion in a frequency domain, the first decoding processor having: a spectral decoder for decoding first spectral portions with a high spectral resolution and for synthesizing second spectral portions using a parametric representation of the second spectral portions and at least a decoded first spectral portion to obtain a decoded spectral representation, wherein the spectral decoder is configured to generate the first decoded representation so that a first spectral portion is placed with respect to frequency-time between two second spectral portions; and a frequency-time converter for converting the decoded spectral representation into a time domain to obtain a decoded first audio signal portion; a second decoding processor for decoding a second encoded audio signal portion in the time domain to obtain a decoded second audio signal portion, wherein the second decoding processor has: a time domain low band decoder for decoding a low band time domain signal; an upsampler for upsampling the low band time domain signal; a time domain bandwidth extension decoder for synthesizing a high band of a time domain output signal; and a mixer for mixing a synthesized high band of the time domain signal and an upsampled low band time domain signal; and a combiner for combining the decoded first spectral portion and the decoded second spectral portion to obtain a decoded audio signal.

According to still another embodiment, a method of encoding an audio signal may have the steps of: first encoding a first audio signal portion in a frequency domain, wherein the first encoding has: converting the first audio signal portion into a frequency domain representation having spectral lines up to a maximum frequency of the first audio signal portion; analyzing the frequency domain representation up to the maximum frequency to determine first spectral portions to be encoded with a first spectral resolution and second spectral portions to be encoded with a second spectral resolution, the second spectral resolution being lower than the first spectral resolution, wherein the analyzing determines a first spectral portion from the first spectral portions, the first spectral portion being placed, with respect to frequency, between two second spectral portions from the second spectral portions; encoding the first spectral portions with the first spectral resolution and for encoding the second spectral portions with the second spectral resolution, wherein the encoding the second spectral portion has calculating, from the second spectral portions, spectral envelope information having the second spectral resolution; second encoding a second different audio signal portion in the time domain wherein the second encoding has: converting the second audio signal portion to a lower sampling rate representation, the lower sampling rate being lower than a sampling rate of the audio signal, wherein the lower sampling rate representation does not include the high band of the input signal; time domain encoding the lower sampling rate representation; and parametrically encoding the high band; analyzing the audio signal and determining, which portion of the audio signal is the first audio signal portion encoded in the frequency domain and which portion of the audio signal is the second audio signal portion encoded in the time domain; and forming an encoded audio signal having a first encoded signal portion for the first audio signal portion and a second encoded signal portion for the second audio signal portion.

According to another embodiment, a method of decoding an encoded audio signal may have the steps of: first decoding a first encoded audio signal portion in a frequency domain, the first decoding having: decoding first spectral portions with a high spectral resolution and synthesizing second spectral portions using a parametric representation of the second spectral portions and at least a decoded first spectral portion to obtain a decoded spectral representation, wherein decoding has generating the first decoded representation so that a first spectral portion is placed with respect to frequency between two second spectral portions; and converting the decoded spectral representation into a time domain to obtain a decoded first audio signal portion; second decoding a second encoded audio signal portion in the time domain to obtain a decoded second audio signal portion, wherein the second decoding has: decoding a low band time domain signal; upsampling the low band time domain signal; synthesizing a high band of a time domain output signal; and mixing a synthesized high band of the time domain signal and an upsampled low band time domain signal; and combining the decoded first spectral portion and the decoded second spectral portion to obtain a decoded audio signal.

Another embodiment may have a non-transitory digital storage medium having stored thereon a computer program for performing a method of encoding an audio signal, having: first encoding a first audio signal portion in a frequency domain, wherein the first encoding has: converting the first audio signal portion into a frequency domain representation having spectral lines up to a maximum frequency of the first audio signal portion; analyzing the frequency domain representation up to the maximum frequency to determine first spectral portions to be encoded with a first spectral resolution and second spectral portions to be encoded with a second spectral resolution, the second spectral resolution being lower than the first spectral resolution, wherein the analyzing determines a first spectral portion from the first spectral portions, the first spectral portion being placed, with respect to frequency, between two second spectral portions from the second spectral portions; encoding the first spectral portions with the first spectral resolution and for encoding the second spectral portions with the second spectral resolution, wherein the encoding the second spectral portion has calculating, from the second spectral portions, spectral envelope information having the second spectral resolution; second encoding a second different audio signal portion in the time domain wherein the second encoding has: converting the second audio signal portion to a lower sampling rate representation, the lower sampling rate being lower than a sampling rate of the audio signal, wherein the lower sampling rate representation does not include the high band of the input signal; time domain encoding the lower sampling rate representation; and parametrically encoding the high band; analyzing the audio signal and determining, which portion of the audio signal is the first audio signal portion encoded in the frequency domain and which portion of the audio signal is the second audio signal portion encoded in the time domain; and forming an encoded audio signal having a first encoded signal portion for the first audio signal portion and a second encoded signal portion for the second audio signal portion, when said computer program is run by a computer.

Still another embodiment may have a non-transitory digital storage medium having stored thereon a computer program for performing a method of decoding an encoded audio signal, having: first decoding a first encoded audio signal portion in a frequency domain, the first decoding having: decoding first spectral portions with a high spectral resolution and synthesizing second spectral portions using a parametric representation of the second spectral portions and at least a decoded first spectral portion to obtain a decoded spectral representation, wherein decoding has generating the first decoded representation so that a first spectral portion is placed with respect to frequency between two second spectral portions; and converting the decoded spectral representation into a time domain to obtain a decoded first audio signal portion; second decoding a second encoded audio signal portion in the time domain to obtain a decoded second audio signal portion, wherein the second decoding has: decoding a low band time domain signal; upsampling the low band time domain signal; synthesizing a high band of a time domain output signal; and mixing a synthesized high band of the time domain signal and an upsampled low band time domain signal; and combining the decoded first spectral portion and the decoded second spectral portion to obtain a decoded audio signal, when said computer program is run by a computer.

The present invention is based on the finding that a time domain encoding/decoding processor can be combined with a frequency domain encoding/decoding processor having a gap filling functionality but this gap filling functionality for filling spectral holes is operated over the whole band of the audio signal or at least above a certain gap filling frequency. Importantly, the frequency domain encoding/decoding processor is particularly in the position to perform accurate or wave form or spectral value encoding/decoding up to the maximum frequency and not only until a crossover frequency. Furthermore, the full-band capability of the frequency domain encoder for encoding with the high resolution allows an integration of the gap filling functionality into the frequency domain encoder.

Hence, in accordance with the present invention by using the full-band spectral encoder/decoder processor, the problems related to the separation of the bandwidth extension on the one hand and the core coding on the other hand can be addressed and overcome by performing the bandwidth extension in the same spectral domain in which the core decoder operates. Therefore, a full rate core decoder is provided which encodes and decodes the full audio signal range. This does not require the need for a downsampler on the encoder side and an upsampler on the decoder side. Instead, the whole processing is performed in the full sampling rate or full-bandwidth domain. In order to obtain a high coding gain, the audio signal is analyzed in order to find a first set of first spectral portions which has to be encoded with a high resolution, where this first set of first spectral portions may include, in an embodiment, tonal portions of the audio signal. On the other hand, non-tonal or noisy components in the audio signal constituting a second set of second spectral portions are parametrically encoded with low spectral resolution. The encoded audio signal then only necessitates the first set of first spectral portions encoded in a waveform-preserving manner with a high spectral resolution and, additionally, the second set of second spectral portions encoded parametrically with a low resolution using frequency "tiles" sourced from the first set. On the decoder side, the core decoder, which is a full-band decoder, reconstructs the first set of first spectral portions in a waveform-preserving manner, i.e., without any knowledge that there is any additional frequency regeneration. However, the so generated spectrum has a lot of spectral gaps. These gaps are subsequently filled with the inventive Intelligent Gap Filling (IGF) technology by using a frequency regeneration applying parametric data on the one hand and using a source spectral range, i.e., first spectral portions reconstructed by the full rate audio decoder on the other hand.

In further embodiments, spectral portions, which are reconstructed by noise filling only rather than bandwidth replication or frequency tile filling, constitute a third set of third spectral portions. Due to the fact that the coding concept operates in a single domain for the core coding/decoding on the one hand and the frequency regeneration on the other hand, the IGF is not only restricted to fill up a higher frequency range but can fill up lower frequency ranges, either by noise filling without frequency regeneration or by frequency regeneration using a frequency tile at a different frequency range.

Furthermore, it is emphasized that an information on spectral energies, an information on individual energies or an individual energy information, an information on a survive energy or a survive energy information, an information a tile energy or a tile energy information, or an information on a missing energy or a missing energy information may comprise not only an energy value, but also an (e.g. absolute) amplitude value, a level value or any other value, from which a final energy value can be derived. Hence, the information on an energy may e.g. comprise the energy value itself, and/or a value of a level and/or of an amplitude and/or of an absolute amplitude.

A further aspect is based on the finding that the correlation situation is not only important for the source range but is also important for the target range. Furthermore, the present invention acknowledges the situation that different correlation situations can occur in the source range and the target range. When, for example, a speech signal with high frequency noise is considered, the situation can be that the low frequency band comprising the speech signal with a small number of overtones is highly correlated in the left channel and the right channel, when the speaker is placed in the middle. The high frequency portion, however, can be strongly uncorrelated due to the fact that there might be a different high frequency noise on the left side compared to another high frequency noise or no high frequency noise on the right side. Thus, when a straightforward gap filling operation would be performed that ignores this situation, then the high frequency portion would be correlated as well, and this might generate serious spatial segregation artifacts in the reconstructed signal. In order to address this issue, parametric data for a reconstruction band or, generally, for the second set of second spectral portions which have to be reconstructed using a first set of first spectral portions is calculated to identify either a first or a second different two-channel representation for the second spectral portion or, stated differently, for the reconstruction band. On the encoder side, a two-channel identification is, therefore calculated for the second spectral portions, i.e., for the portions, for which, additionally, energy information for reconstruction bands is calculated. A frequency regenerator on the decoder side then regenerates a second spectral portion depending on a first portion of the first set of first spectral portions, i.e., the source range and parametric data for the second portion such as spectral envelope energy information or any other spectral envelope data and, additionally, dependent on the two-channel identification for the second portion, i.e., for this reconstruction band under reconsideration.

The two-channel identification is advantageously transmitted as a flag for each reconstruction band and this data is transmitted from an encoder to a decoder and the decoder then decodes the core signal as indicated by advantageously calculated flags for the core bands. Then, in an implementation, the core signal is stored in both stereo representations (e.g. left/right and mid/side) and, for the IGF frequency tile filling, the source tile representation is chosen to fit the target tile representation as indicated by the two-channel identification flags for the intelligent gap filling or reconstruction bands, i.e., for the target range.

It is emphasized that this procedure not only works for stereo signals, i.e., for a left channel and the right channel but also operates for multi-channel signals. In the case of multi-channel signals, several pairs of different channels can be processed in that way such as a left and a right channel as a first pair, a left surround channel and a right surround as the second pair and a center channel and an LFE channel as the third pair. Other pairings can be determined for higher output channel formats such as 7.1, 11.1 and so on.

A further aspect is based on the finding that the audio quality of the reconstructed signal can be improved through IGF since the whole spectrum is accessible to the core encoder so that, for example, perceptually important tonal portions in a high spectral range can still be encoded by the core coder rather than parametric substitution. Additionally, a gap filling operation using frequency tiles from a first set of first spectral portions which is, for example, a set of tonal portions typically from a lower frequency range, but also from a higher frequency range if available, is performed. For the spectral envelope adjustment on the decoder side, however, the spectral portions from the first set of spectral portions located in the reconstruction band are not further post-processed by e.g. the spectral envelope adjustment. Only the remaining spectral values in the reconstruction band which do not originate from the core decoder are to be envelope adjusted using envelope information. Advantageously, the envelope information is a full-band envelope information accounting for the energy of the first set of first spectral portions in the reconstruction band and the second set of second spectral portions in the same reconstruction band, where the latter spectral values in the second set of second spectral portions are indicated to be zero and are, therefore, not encoded by the core encoder, but are parametrically coded with low resolution energy information.

It has been found that absolute energy values, either normalized with respect to the bandwidth of the corresponding band or not normalized, are useful and very efficient in an application on the decoder side. This especially applies when gain factors have to be calculated based on a residual energy in the reconstruction band, the missing energy in the reconstruction band and frequency tile information in the reconstruction band.

Furthermore, it is of advantage that the encoded bitstream not only covers energy information for the reconstruction bands but, additionally, scale factors for scale factor bands extending up to the maximum frequency. This ensures that for each reconstruction band, for which a certain tonal portion, i.e., a first spectral portion is available, this first set of first spectral portion can actually be decoded with the right amplitude. Furthermore, in addition to the scale factor for each reconstruction band, an energy for this reconstruction band is generated in an encoder and transmitted to a decoder. Furthermore, it is of advantage that the reconstruction bands coincide with the scale factor bands or in case of energy grouping, at least the borders of a reconstruction band coincide with borders of scale factor bands.

A further aspect is based on the finding that certain impairments in audio quality can be remedied by applying a signal adaptive frequency tile filling scheme. To this end, an analysis on the encoder-side is performed in order to find out the best matching source region candidate for a certain target region. A matching information identifying for a target region a certain source region together with optionally some additional information is generated and transmitted as side information to the decoder. The decoder then applies a frequency tile filling operation using the matching information. To this end, the decoder reads the matching information from the transmitted data stream or data file and accesses the source region identified for a certain reconstruction band and, if indicated in the matching information, additionally performs some processing of this source region data to generate raw spectral data for the reconstruction band. Then, this result of the frequency tile filling operation, i.e., the raw spectral data for the reconstruction band, is shaped using spectral envelope information in order to finally obtain a reconstruction band that comprises the first spectral portions such as tonal portions as well. These tonal portions, however, are not generated by the adaptive tile filling scheme, but these first spectral portions are output by the audio decoder or core decoder directly.

The adaptive spectral tile selection scheme may operate with a low granularity. In this implementation, a source region is subdivided into typically overlapping source regions and the target region or the reconstruction bands are given by non-overlapping frequency target regions. Then, similarities between each source region and each target region are determined on the encoder-side and the best matching pair of a source region and the target region are identified by the matching information and, on the decoder-side, the source region identified in the matching information is used for generating the raw spectral data for the reconstruction band.

For the purpose of obtaining a higher granularity, each source region is allowed to shift in order to obtain a certain lag where the similarities are maximum. This lag can be as fine as a frequency bin and allows an even better matching between a source region and the target region.

Furthermore, in addition of only identifying a best matching pair, this correlation lag can also be transmitted within the matching information and, additionally, even a sign can be transmitted. When the sign is determined to be negative on the encoder-side, then a corresponding sign flag is also transmitted within the matching information and, on the decoder-side, the source region spectral values are multiplied by "−1" or, in a complex representation, are "rotated" by 180 degrees.

A further implementation of this invention applies a tile whitening operation. Whitening of a spectrum removes the coarse spectral envelope information and emphasizes the spectral fine structure which is of foremost interest for evaluating tile similarity. Therefore, a frequency tile on the one hand and/or the source signal on the other hand are whitened before calculating a cross correlation measure. When only the tile is whitened using a predefined procedure, a whitening flag is transmitted indicating to the decoder that the same predefined whitening process shall be applied to the frequency tile within IGF.

Regarding the tile selection, it is of advantage to use the lag of the correlation to spectrally shift the regenerated spectrum by an integer number of transform bins. Depending on the underlying transform, the spectral shifting may necessitate addition corrections. In case of odd lags, the tile is additionally modulated through multiplication by an alternating temporal sequence of −1/1 to compensate for the frequency-reversed representation of every other band within the MDCT. Furthermore, the sign of the correlation result is applied when generating the frequency tile.

Furthermore, it is of advantage to use tile pruning and stabilization in order to make sure that artifacts created by fast changing source regions for the same reconstruction region or target region are avoided. To this end, a similarity analysis among the different identified source regions is performed and when a source tile is similar to other source tiles with a similarity above a threshold, then this source tile can be dropped from the set of potential source tiles since it is highly correlated with other source tiles. Furthermore, as a kind of tile selection stabilization, it is of advantage to keep the tile order from the previous frame if none of the source tiles in the current frame correlate (better than a given threshold) with the target tiles in the current frame.

A further aspect is based on the finding that an improved quality and reduced bitrate specifically for signals comprising transient portions as they occur very often in audio signals is obtained by combining the Temporal Noise Shaping (TNS) or Temporal Tile Shaping (TTS) technology with high frequency reconstruction. The TNS/TTS processing on the encoder-side being implemented by a prediction over frequency reconstructs the time envelope of the audio signal. Depending on the implementation, i.e., when the temporal noise shaping filter is determined within a frequency range not only covering the source frequency range but also the target frequency range to be reconstructed in a frequency regeneration decoder, the temporal envelope is not only applied to the core audio signal up to a gap filling start frequency, but the temporal envelope is also applied to the spectral ranges of reconstructed second spectral portions. Thus, pre-echoes or post-echoes that would occur without temporal tile shaping are reduced or eliminated. This is accomplished by applying an inverse prediction over frequency not only within the core frequency range up to a certain gap filling start frequency but also within a frequency range above the core frequency range. To this end, the frequency regeneration or frequency tile generation is performed on the decoder-side before applying a prediction over frequency. However, the prediction over frequency can either be applied before or subsequent to spectral envelope shaping depending on whether the energy information calculation has been performed on the spectral residual values subsequent to filtering or to the (full) spectral values before envelope shaping.

The TTS processing over one or more frequency tiles additionally establishes a continuity of correlation between the source range and the reconstruction range or in two adjacent reconstruction ranges or frequency tiles.

In an implementation, it is of advantage to use complex TNS/TTS filtering. Thereby, the (temporal) aliasing artifacts of a critically sampled real representation, like MDCT, are avoided. A complex TNS filter can be calculated on the encoder-side by applying not only a modified discrete cosine transform but also a modified discrete sine transform in addition to obtain a complex modified transform. Nevertheless, only the modified discrete cosine transform values, i.e., the real part of the complex transform is transmitted. On the decoder-side, however, it is possible to estimate the imaginary part of the transform using MDCT spectra of preceding or subsequent frames so that, on the decoder-side, the complex filter can be again applied in the inverse prediction over frequency and, specifically, the prediction over the border between the source range and the reconstruction range and also over the border between frequency-adjacent frequency tiles within the reconstruction range.

The inventive audio coding system efficiently codes arbitrary audio signals at a wide range of bitrates. Whereas, for high bitrates, the inventive system converges to transparency, for low bitrates perceptual annoyance is minimized. Therefore, the main share of available bitrate is used to waveform code just the perceptually most relevant structure of the signal in the encoder, and the resulting spectral gaps are filled in the decoder with signal content that roughly approximates the original spectrum. A very limited bit budget is consumed to control the parameter driven so-called spectral Intelligent Gap Filling (IGF) by dedicated side information transmitted from the encoder to the decoder.

In further embodiments, the time domain encoding/decoding processor relies on a lower sampling rate and the corresponding bandwidth extension functionality.

In further embodiments, a cross-processor is provided in order to initialize the time domain encoder/decoder with initialization data derived from the currently processed frequency domain encoder/decoder signal This allows that when the currently processed audio signal portion is processed by the frequency domain encoder, the parallel time domain encoder is initialized so that when a switch from the frequency domain encoder to a time domain encoder takes place, this time domain encoder can start processing since all the initialization data relating to earlier signals are already there due to the cross-processor. This cross-processor may be applied on the encoder-side and, additionally, on the decoder-side and may use a frequency-time transform which additionally performs a very efficient downsampling from the higher output or input sampling rate into the lower time domain core coder sampling rate by only selecting a certain low band portion of the domain signal together with a certain reduced transform size. Thus, a sample rate conversion from the high sampling rate to the low sampling rate is very efficiently performed and this signal obtained by the transform with the reduced transform size can then be used for initializing the time domain encoder/decoder so that the time domain encoder/decoder is ready to immediately perform time domain encoding when this situation is signaled by a controller and the immediately preceding audio signal portion was encoded in the frequency domain.

Hence, embodiments of the present invention allow a seamless switching of a perceptual audio coder comprising spectral gap filling and a time domain encoder with or without bandwidth extension.

Hence, the present invention relies on methods that are not restricted to removing the high frequency content above a cut-off frequency in the frequency domain encoder from the audio signal but rather signal-adaptively removes spectral band-pass regions leaving spectral gaps in the encoder and subsequently reconstructs these spectral gaps in the decoder. Advantageously, an integrated solution such as intelligent gap filling is used that efficiently combines full-bandwidth audio coding and spectral gap filling particularly in the MDCT transform domain.

Hence, the present invention provides an improved concept for combining speech coding and a subsequent time domain bandwidth extension with a full-band wave form decoding comprising spectral gap filling into a switchable perceptual encoder/decoder.

Hence, in contrast to already existing methods, the new concept utilizes full-band audio signal wave form coding in the transform domain coder and at the same time allows a seamless switching to a speech coder advantageously followed by a time domain bandwidth extension.

Further embodiments of the present invention avoid the explained problems that occur due to a fixed band limitation. The concept enables the switchable combination of a full-band wave form coder in the frequency domain equipped with a spectral gap filling and a lower sampling rate speech coder and a time domain bandwidth extension. Such a coder is capable of wave form coding the aforementioned problematic signals providing full audio bandwidth up to the Nyquist frequency of the audio input signal. Nevertheless, seamless switching between both coding strategies is guaranteed particularly by the embodiments having the cross-processor. For this seamless switching, the cross-processor represents a cross connection at both encoder and decoder between the full-band capable full-rate (input sampling rate) frequency domain encoder and the low-rate ACELP coder having a lower sampling rate to properly initialize the ACELP parameters and buffers particularly within the adaptive codebook, the LPC filter or the resampling stage, when switching from the frequency domain coder such as TCX to the time domain encoder such as ACELP.

BRIEF DESCRIPTION OF THE DRAWINGS

Embodiments of the present invention will subsequently be discussed with respect to the accompanying drawings in which.

DETAILED DESCRIPTION OF THE INVENTION

Figure 6:
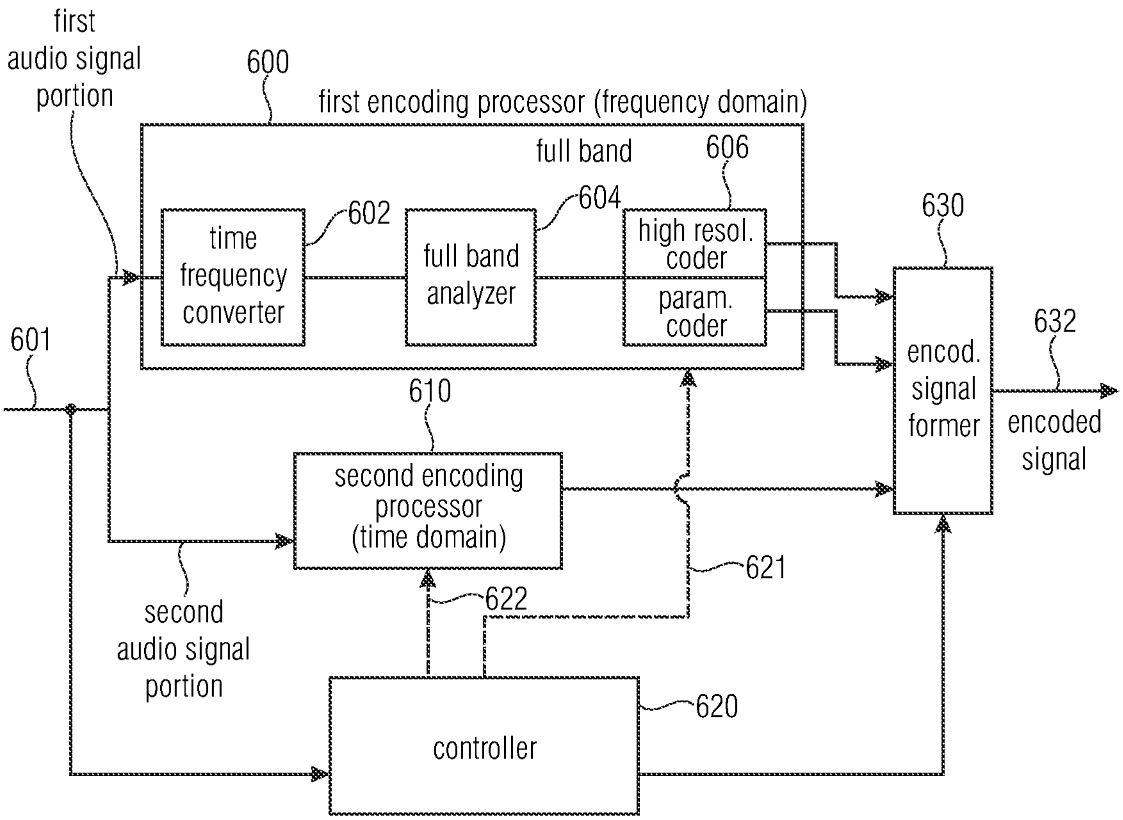
FIG. 6 illustrates an implementation of an audio encoder.

FIG. 6 illustrates an audio encoder for encoding an audio signal comprising a first encoding processor 600 for encoding a first audio signal portion in a frequency domain. The first encoding processor 600 comprises a time frequency converter 602 for converting the first input audio signal portion into a frequency domain representation having spectral lines up to a maximum frequency of the input signal. Furthermore, the first encoding processor 600 comprises an analyzer 604 for analyzing the frequency domain representation up to the maximum frequency to determine first spectral regions to be encoded with a first spectral representation and to determine second spectral regions to be encoded with a second spectral resolution being lower than the first spectral resolution. In particular, the full-band analyzer 604 determines which frequency lines or spectral values in the time frequency converter spectrum are to be encoded spectral-line wise and which other spectral portions are to be encoded in a parametric way and these latter spectral values are then reconstructed on the decoder-side with the gap filling procedure. The actual encoding operation is performed by a spectral encoder 606 for encoding the first spectral regions or spectral portions with the first resolution and for parametrically encoding the second spectral regions or portions with the second spectral resolution.

The audio encoder of FIG. 6 additionally comprises a second encoding processor 610 for encoding the audio signal portion in a time domain. Additionally, the audio encoder comprises a controller 620 configured for analyzing the audio signal at an audio signal input 601 and for determining which portion of the audio signal is the first audio signal portion encoded in the frequency domain and which portion of the audio signal is the second audio signal portion encoded in the time domain. Furthermore, an encoded signal former 630 which can be, for example, implemented as a bit stream multiplexor is provided which is configured for forming an encoded audio signal comprising a first encoded signal portion for the first audio signal portion and a second encoded signal portion for the second audio signal portion. Importantly, the encoded signal only has either a frequency domain representation or a time domain representation from one and the same audio signal portion.

Hence, the controller 620 makes sure that for a single audio signal portion only a time domain representation or a frequency domain representation is in the encoded signal. This can be accomplished by the controller 620 in several ways. One way would be that, for one and the same audio signal portion, both representations arrive at block 630 and the controller 620 controls the encoded signal former 630 to only introduce one of both representations into the encoded signal. Alternatively, however, the controller 620 can control an input into the first encoding processor and an input into the second encoding processor so that, based on the analysis of the corresponding signal portion, only one of both blocks 600 or 610 is activated to actually perform the full encoding operation and the other block is deactivated.

Figure 7A:
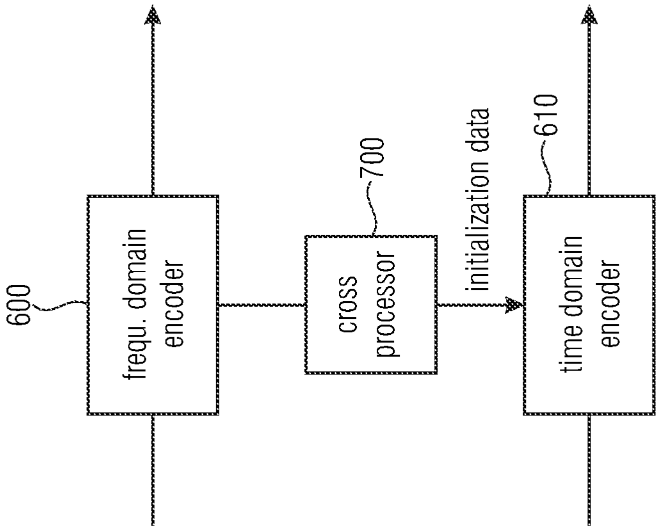
FIG. 7A illustrates a cross-processor within the audio encoder.

This deactivation can be a deactivation or, as illustrated with respect to, for example, FIG. 7A, is only a kind of "initialization" mode where the other encoding processor is only active to receive and process initialization data in order to initialize internal memories but any specific encoding operation is not performed at all. This activation can be done by a certain switch at the input which is not illustrated in FIG. 6 or, advantageously, by control lines 621 and 622. Hence, in this embodiment, the second encoding processor 610 does not output anything when the controller 620 has determined that the current audio signal portion should be encoded by the first encoding processor but the second encoding processor is nevertheless provided with initialization data to be active for an instant switching in the future. On the other hand, the first encoding processor is configured to not need any data from the past to update any internal memories and, therefore, when the current audio signal portion is to be encoded by the second encoding processor 610 then the controller 620 can control the first ending encoding processor 600 via control line 621 to be inactive at all. This means that the first encoding processor 600 does not need to be in an initialization state or waiting state but can be in a complete deactivation state. This is of advantage particularly for mobile devices where power consumption and, therefore, battery life is an issue.

Figure 9:
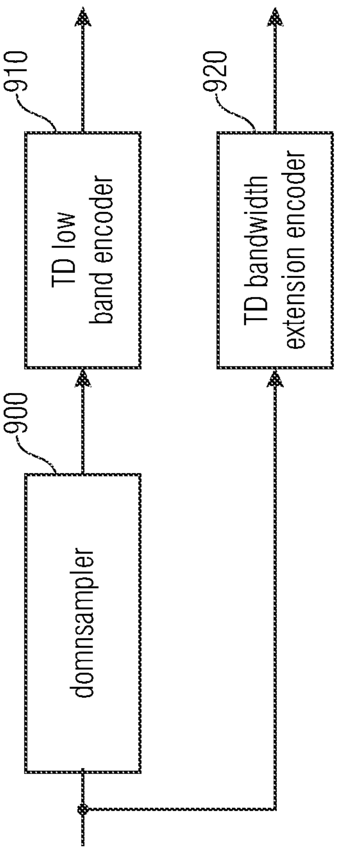
FIG. 9 illustrates a further embodiment of the time domain encoder having bandwidth extension functionalities.

In the further specific implementation of the second encoding processor operating in the time domain, the second encoding processor comprises a downsampler 900 or sampling rate converter for converting the audio signal portion into a representation with a lower sampling rate, wherein the lower sampling rate is lower than a sampling rate at the input into the first encoding processor. This is illustrated in FIG. 9. In particular, when the input audio signal comprises a low band and a high band, it is of advantage that the lower sampling rate representation at the output of block 900 only has the low band of the input audio signal portion and this low band is then encoded by a time domain low band encoder 910 which is configured for time-domain encoding the lower sampling rate representation provided by block 900. Furthermore, a time domain bandwidth extension encoder 920 is provided for parametrically encoding the high band. To this end, the time domain bandwidth extension encoder 920 receives at least the high band of the input audio signal or the low band and the high band of the input audio signal.

Figure 10:
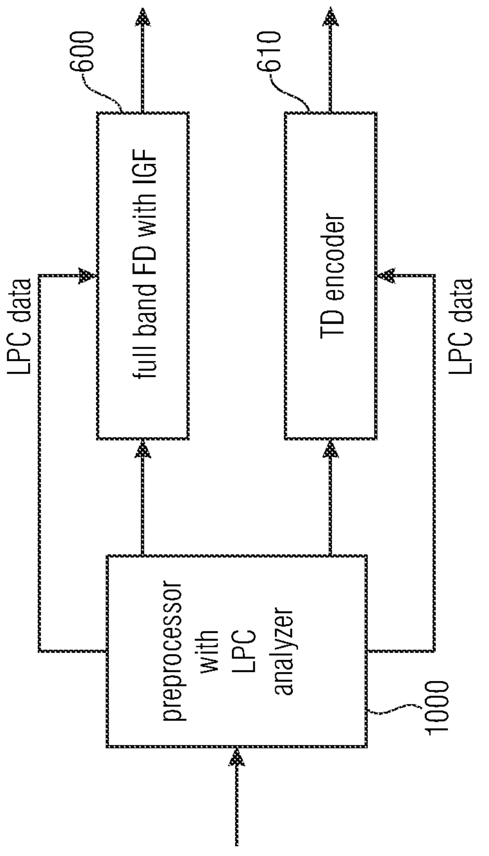
FIG. 10 illustrates an advantageous usage of a preprocessor.

In a further embodiment of the present invention the audio encoder additionally comprises, although not illustrated in FIG. 6 but illustrated in FIG. 10, a preprocessor 1000 configured for preprocessing the first audio signal portion and the second audio signal portion. In an embodiment, this preprocessor comprises a prediction analyzer for determining prediction coefficients. This prediction analyzer can be implemented as an LPC (linear prediction coding) analyzer for determining LPC coefficients. However, other analyzers can be implemented as well. Furthermore, the preprocessor, which is also illustrated in FIG. 14A, comprises a prediction coefficient quantizer 1010, wherein this device illustrated in FIG. 14A receives prediction coefficient data from the prediction analyzer also illustrated in FIG. 14A at 1002.

Furthermore, the preprocessor additionally comprises an entropy coder for generating an encoded version of the quantized prediction coefficients. It is important to note that the encoded signal former 630 or the specific implementation, i.e., the bit stream multiplexor 613 makes sure that the encoded version of the quantized prediction coefficients is included into the encoded audio signal 632. Advantageously, the LPC coefficients are not directly quantized but are converted into an ISF, for example, or any other representation better suited for quantization. This conversion may be performed either by the determined LPC coefficients block 1002 or is performed within the block 1010 for quantizing the LPC coefficients.

Furthermore, the preprocessor may comprise a resampler 1004 for resampling an audio input signal at an input sampling rate into a lower sampling rate for the time domain encoder. When the time domain encoder is an ACELP encoder having a certain ACELP sampling rate then the down sampling is performed to advantageously either 12.8 kHz or 16 kHz. The input sampling rate can be any of a particular number of sampling rates such as 32 kHz or an even higher sampling rate. On the other hand, the sampling rate of the time domain encoder will be predetermined by certain restrictions and the resampler 1004 performs this resampling and outputs the lower sampling rate representation of the input signal. Hence, the resampler 1004 can perform a similar functionality and can even be one and the same element as the downsampler 900 illustrated in the context of FIG. 9.

Figure 14A:
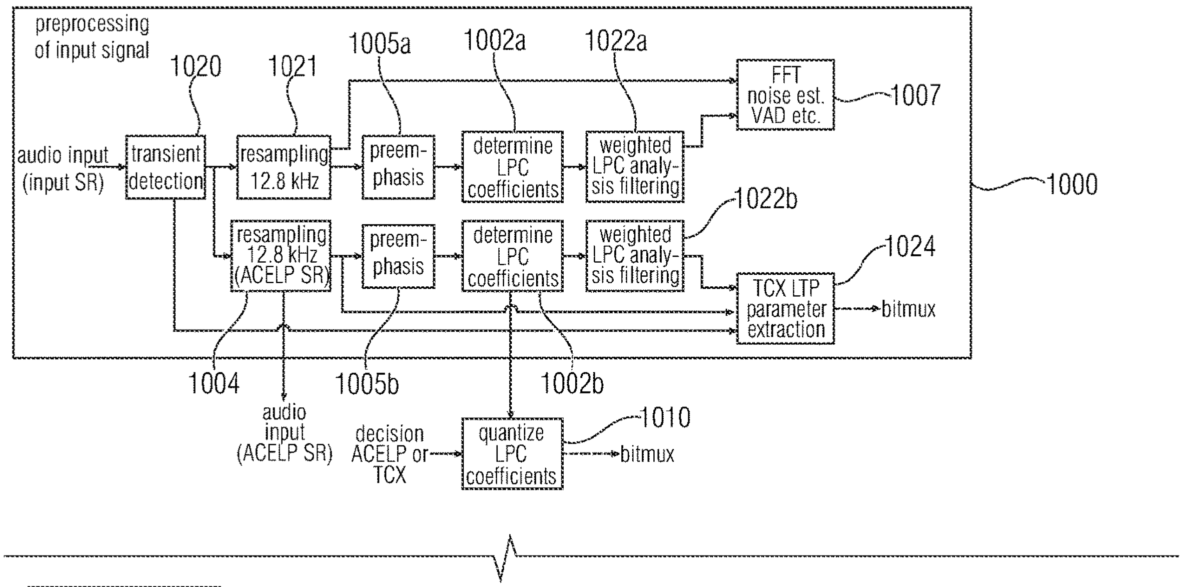
FIG. 14A consisting of FIGS. 14A-1 and 14A-2 illustrates an implementation of an audio encoder.
Figure 1:
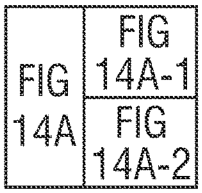
Figures 2, 14A:
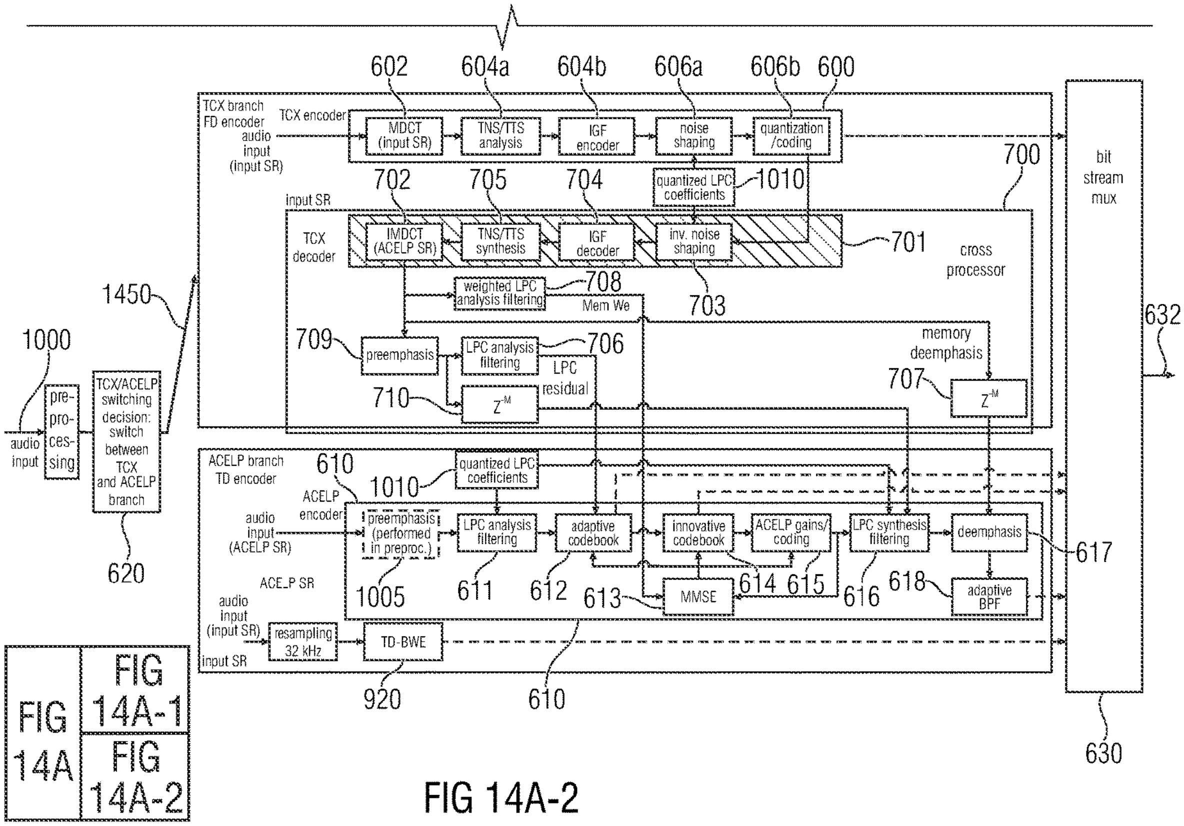

Furthermore, it is of advantage to apply a pre-emphasis in the pre-emphasis block 1005 in FIG. 14A. The pre-emphasis processing is well-known in the art of time domain encoding and is described in literature referring to the AMR-WB+ processing and the pre-emphasis is particularly configured for compensating for a spectral tilt and, therefore, allows a better calculation of LPC parameters at a given LPC order.

Figure 14B:
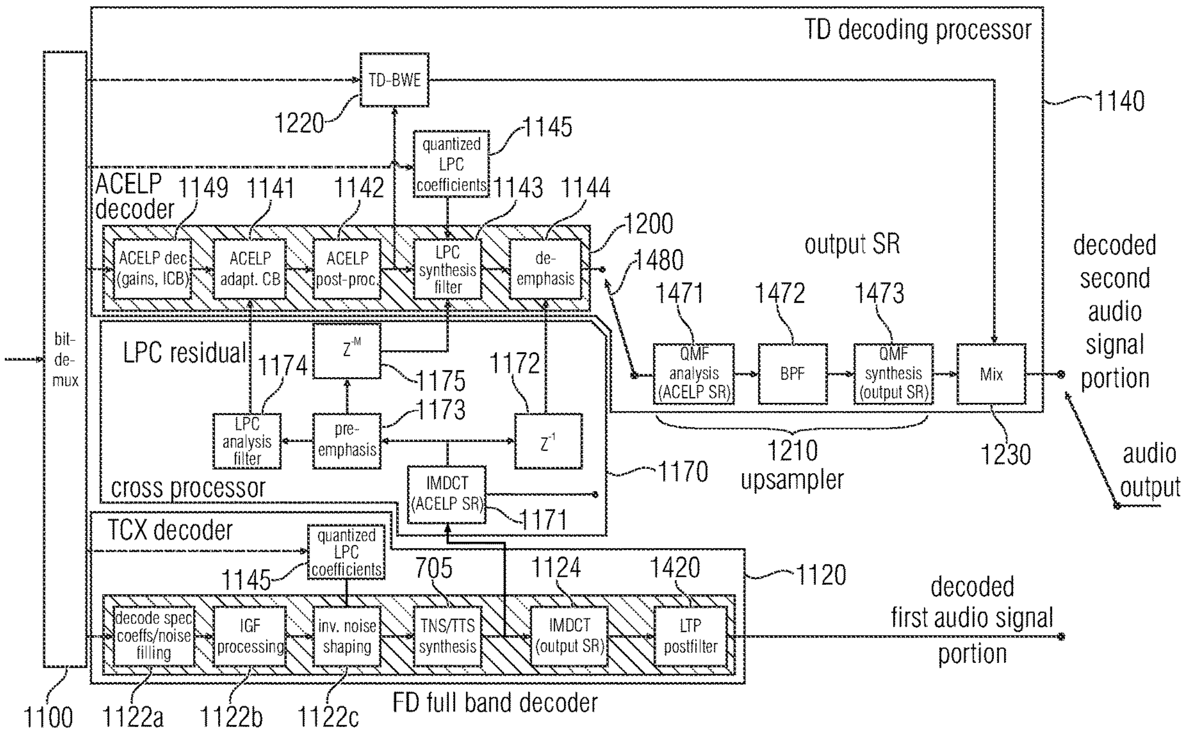
FIG. 14B illustrates an implementation of an audio decoder.

Furthermore, the preprocessor may additionally comprise a TCX-LTP parameter extraction for controlling an LTP post filter illustrated at 1420 in FIG. 14B. This block is illustrated at 1006 in FIG. 14A. Furthermore, the preprocessor may additionally comprise other functionalities illustrated at 1007 and these other functionalities may comprise a pitch search functionality, a voice activity detection (VAD) functionality or any other functionalities known in the art of time domain or speech coding.

As illustrated, the result of block 1006 is input into the encoded signal, i.e., is in the embodiment of FIG. 14A, input into the bit stream multiplexor 630. Furthermore, if necessitated, data from block 1007 can also be introduced into the bit stream multiplexor or can, alternatively, be used for the purpose of time domain encoding in the time domain encoder.

Hence, to summarize, common to both paths is a preprocessing operation 1000 in which commonly used signal processing operations are performed. These comprise a resampling to an ACELP sampling rate (12.8 or 16 kHz) for one parallel path and this resampling is performed. Furthermore, a TCX LTP parameter extraction illustrated at block 1006 is performed and, additionally, a pre-emphasis and a determination of LPC coefficients is performed. As outlined, the pre-emphasis compensates for the spectral tilt and, therefore, makes the calculation of LPC parameters at a given LPC order more efficient.

Subsequently, reference is made to FIG. 8 in order to illustrate an implementation of the controller 620. The controller receives, at an input, the audio signal portion under consideration. Advantageously, as illustrated in 14A, the controller receives any signal available in the preprocessor 1000 which can either be the original input signal at the input sampling rate or a resampled version at the lower time domain encoder sampling rate or a signal obtained subsequent to the pre-emphasis processing in block 1005.

Based on this audio signal portion, the controller 620 addresses a frequency domain encoder simulator 621 and a time domain encoder simulator 622 in order to calculate for each encoder possibility an estimated signal to noise ratio. Subsequently, the selector 623 selects the encoder which has provided the better signal to noise ratio, naturally under the consideration of a predefined bit rate. The selector then identifies the corresponding encoder via the control output. When it is determined that the audio signal portion under consideration is to be encoded using the frequency domain encoder, the time domain encoder is set into an initialization state or in other embodiments not requiring a very instant switching in a completely deactivated state. However, when it is determined that the audio signal portion under consideration is to be encoded by the time domain encoder, the frequency domain encoder is then deactivated.

Figure 8:
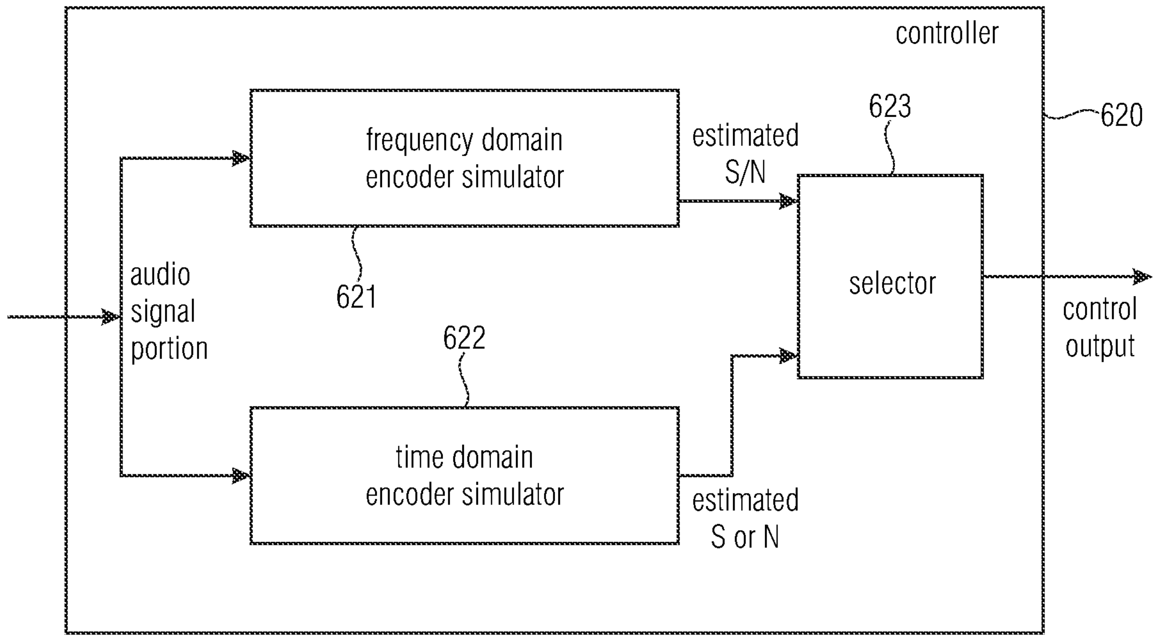
FIG. 8 illustrates an implementation of the controller of FIG. 6.

Subsequently, an implementation of the controller illustrated in FIG. 8 is illustrated. The decision whether ACELP or TCX path should be chosen is performed in the switching decision by simulating the ACELP and TCX encoder and switch to the better performing branch. For this, the SNR of the ACELP and TCX branch are estimated based on an ACELP and TCX encoder/decoder simulation. The TCX encoder/decoder simulation is performed without TNS/TTS analysis, IGF encoder, quantization-loop/arithmetic coder, or without any TCX decoder, Instead, the TCX SNR is estimated using an estimation of the quantizer distortion in the shaped MDCT domain. The ACELP encoder/decoder simulation is performed using only a simulation of the adaptive codebook and innovative codebook. The ACELP SNR is simply estimated by computing the distortion introduced by a LTP filter in the weighted signal domain (adaptive codebook) and scaling this distortion by a constant factor (innovative codebook). Thus, the complexity is greatly reduced compared to an approach where TCX and ACELP encoding is executed in parallel. The branch with the higher SNR is chosen for the subsequent complete encoding run.

In case the TCX branch is chosen, a TCX decoder is run in each frame which outputs a signal at the ACELP sampling rate. This is used to update the memories used for the ACELT encoding path (LPC residual, Mem w0, Memory deemphasis), to enable instant switching from TCX to ACELP. The memory update is performed in each TCX path.

Alternatively, a full analysis by synthesis process can performed, i.e., both encoder simulators 621, 622 implement the actual encoding operations and the results are compared by the selector 623. Alternatively, again, a complete feed forward calculation can be done by performing a signal analysis. For example, when it is determined that the signal is a speech signal by a signal classifier the time domain encoder is selected and when it is determined that the signal is a music signal then the frequency domain encoder is selected. Other procedures in order to distinguish between both encoders based on a signal analysis of the audio signal portion under consideration can also be applied.

Advantageously, the audio encoder additionally comprises a cross-processor 700 illustrated in FIG. 7A. When the frequency domain encoder 600 is active, the cross-processor 700 provides initialization data to the time domain encoder 610 so that the time domain encoder is ready for a seamless switch in a future signal portion. In other words, when the current signal portion is determined to be encoded using the frequency domain encoder, and when it is determined by the controller that the immediately following audio signal portion is to be encoded by the time domain encoder 610 then, without the cross-processor, such an immediate seamless switch would not be possible. The cross-processor, however, provides a signal derived from the frequency domain encoder 600 to the time domain encoder 610 for the purpose of initializing memories in the time domain encoder since the time domain encoder 610 has a dependency of a current frame from the input or encoded signal of an immediately in time preceding frame.

Hence, the time domain encoder 610 is configured to be initialized by the initialization data in order to encode an audio signal portion following an earlier audio signal portion encoded by the frequency domain encoder 600 in an efficient manner.

In particular, the cross-processor comprises a time converter for converting a frequency domain representation into a time domain representation which can be forwarded to the time domain encoder directly or after some further processing. This converter is illustrated in FIG. 14A as an IMDCT (inverse modified discrete cosine transform) block. This block 702, however, has a different transform size compared to the time-frequency converter block 602 indicated in FIG. 14A block (modified discrete cosine transform block). As indicated in block 602, the time-frequency converter 602 operates at the input sampling rate and the inverse modified discrete cosine transform 702 operates at the lower ACELP sampling rate.

Figure 7B:
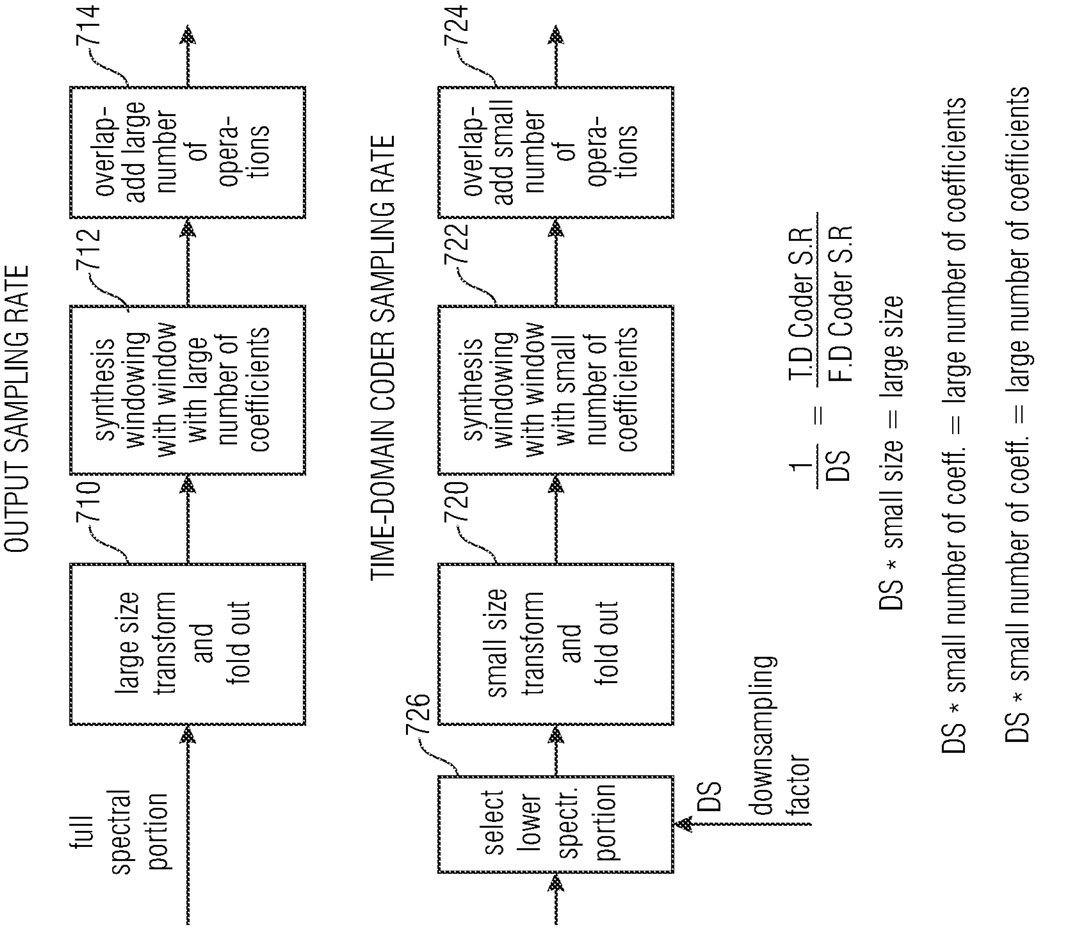
FIG. 7B illustrates an implementation of an inverse or frequency-time transform additionally providing a sampling rate reduction within the cross-processor.

The ratio of the time domain coder sampling rate or ACELP sampling rate and the frequency domain coder sampling rate or input sampling rate can be calculated and is a downsampling factor DS illustrated in FIG. 7B. The block 602 has a large transform size and the IMDCT block 702 has a small transform size. As illustrated in FIG. 7B, the IMDCT block 702 therefore comprises a selector 726 for selecting the lower spectral portion of an input into the IMDCT block 702. The portion of the full-band spectrum is defined by the downsampling factor DS. For example, when the lower sampling rate is 16 kHz and the input sampling rate is 32 KHz then the downsampling factor is 0.5 and, therefore, the selector 726 selects the lower half of the full-band spectrum. When the spectrum has, for example, 1024 MDCT lines then the selector selects the lower 512 MDCT lines.

This low frequency portion of the full-band spectrum is input into a small size transform and foldout block 720, as illustrated in FIG. 7B. The transform size is also selected in accordance with the downsampling factor and is 50% of the transform size in block 602. As synthesis windowing with a window with a small number of coefficients is then performed. The number of coefficients of the synthesis window is equal to the downsampling factor multiplied by the number of coefficients of the analysis window used by block 602. Finally, an overlap add operation is performed with a smaller number of operations per block and the number of operations per block is again the number of operations per block in a full rate implementation MDCT multiplied by the downsampling factor.

Thus, a very efficient downsampling operation can be applied since the downsampling is included in the IMDCT implementation. In this context, it is emphasized that the block 702 can be implemented by an IMDCT but can also be implemented by any other transform or filterbank implementation which can be suitably sized in the actual transform kernel and other transform related operations.

In a further embodiment illustrated in FIG. 14A, the time-frequency converter comprises additional functionalities in addition to the analyzer. The analyzer 604 of FIG. 6 may comprise in the embodiment of FIG. 14A a temporal noise shaping/temporal tile shaping analysis block 604*a* operating as discussed in the context of FIG. 2B block 222 for the TNS/TTS analysis block 604*a* and illustrated with respect to FIG. 2B for the tonal mask 226 which corresponds to the IGF encoder 604*b* in FIG. 14A.

Furthermore, the frequency domain encoder may comprise a noise shaping block 606*a*. The noise shaping block 606*a* is controlled by quantized LPC coefficients as generated by block 1010. The quantized LPC coefficients used for noise shaping 606*a* perform a spectral shaping of the high resolution spectral values or spectral lines directly encoded (rather than parametrically encoded) and the result of block 606*a* is similar to the spectrum of a signal subsequent to an LPC filtering stage operating in the time domain such as an LPC analysis filtering block 704 to be described later on. Furthermore, the result of the noise shaping block 606*a* is then quantized and entropy coded as indicated by block 606*b*. The result of block 606*b* corresponds to the encoded first audio signal portion or a frequency domain coded audio signal portion (together with other side information).

The cross-processor 700 comprises a spectral decoder for calculating a decoded version of the first encoded signal portion. In the embodiment of FIG. 14A, the spectral decoder 701 comprises an inverse noise shaping block 703, a gap filling decoder 704, a TNS/TTS synthesis block 705 and the IMDCT block 702 discussed before. These blocks undo the specific operations performed by blocks 602 to 606*b*. In particular, a noise shaping block 703 undoes the noise shaping performed by block 606*a* based on the quantized LPC coefficients 1010. The IGF decoder 704 operates as discussed with respect to FIG. 2A, blocks 202 and 206 and the TNS/TTS synthesis block 705 operates as discussed in the context of block 210 of FIG. 2A and the spectral decoder additionally comprises the IMDCT block 702. Furthermore, the cross processor 700 in FIG. 14A additionally or alternatively comprises a delay stage 707 for feeding a delayed version of the decoded version obtained by the spectral decoder 701 in a de-emphasis stage 617 of the second encoding processor for the purpose of initializing the de-emphasis stage 617.

Furthermore, the cross-processor 17 may comprise in addition or alternatively a weighted prediction coefficient analysis filtering stage 708 for filtering the decoded version and for feeding a filtered decoded version to a codebook determinator 613 indicated as “MMSE” in FIG. 14A of the second encoding processor for initializing this block. Additionally or alternatively, the cross-processor comprises the LPC analysis filtering stage for filtering the decoded version of the first encoded signal portion output by the spectral decoder 700 to an adaptive codebook stage 712 for initialization of the block 612. In addition, or alternatively, the cross-processor also comprises a pre-emphasis stage 709 for performing a pre-emphasis processing to the decoded version output by a spectral decoder 701 before the LPC filtering. The pre-emphasis stage output can also be fed to a further delay stage 710 for the purpose of initializing an LPC synthesis filtering block 616 within the time domain encoder 610 for the purpose of initializing this LPC analysis filtering block 611.

The time domain encoder processor 610 comprises, as illustrated in FIG. 14A, a pre-emphasis operating on the lower ACELP sampling rate. As illustrated, this pre-emphasis is the pre-emphasis performed in the preprocessing stage 1000 and has reference number 1005. The pre-emphasis data is input into an LPC analysis filtering stage 611 operating in the time domain and this filter is controlled by the quantized LPC coefficients 1010 obtained by the preprocessing stage 1000. As known from AMR-WB+ or USAC or other CELP encoders, the residual signal generated by block 611 is provided to an adaptive codebook 612 and, furthermore, the adaptive codebook 612 is connected to an innovative codebook stage 614 and the codebook data from the adaptive codebook 612 and from the innovative codebook are input into the bitstream multiplexor as illustrated.

Furthermore, an ACELP gains/coding stage 612 is provided in series to the innovative codebook stage 614 and the result of this block is input into a codebook determinator 613 indicated as MMSE in FIG. 14A. This block cooperates with the innovative codebook block 614. Furthermore, the time domain encoder additionally comprises a decoder portion having an LPC synthesis filtering block 616, a de-emphasis block 617 and an adaptive bass post filter stage 618 for calculating parameters for an adaptive bass post filter which is, however, applied at the decoder-side. Without any adaptive bass post filtering on the decoder side, blocks 616, 617, 618 would not be necessary for the time domain encoder 610.

As illustrated, several blocks of the time domain decoder depend on previous signals and these blocks are the adaptive codebook block, the codebook determinator 613, the LPC synthesis filtering block 616 and the de-emphasis block 617. These blocks are provided with data from the cross-processor derived from the frequency domain encoding processor data in order to initialize these blocks for the purpose of being ready for an instant switch from the frequency domain encoder to the time domain encoder. As can also be seen from FIG. 14A, any dependence on earlier data is not necessary for the frequency domain encoder. Therefore, the cross-processor 700 does not provide any memory initialization data from the time domain encoder to the frequency domain encoder. However, for other implementations of the frequency domain encoder, where dependencies from the past exist and where memory initialization data is necessitated, the cross-processor 700 is configured to operate in both directions.

An embodiment of an audio encoder therefore comprises the following parts:

The audio decoder is described in the following: The waveform decoder part consists of a full-band TCX decoder path with IGF both operating at the input sampling rate of the codec. In parallel, an alternative ACELP decoder path at lower sampling rate exists that is reinforced further downstream by a TD-BWE.

For ACELP initialization when switching from TCX to ACELP, a cross path (consisting of a shared TCX decoder frontend but additionally providing output at the lower sampling rate and some post-processing) exists that performs the inventive ACELP initialization. Sharing the same sampling rate and filter order between TCX and ACELP in the LPCs allows for an easier and more efficient ACELP initialization.

For visualizing the switching, two switches are sketched in 14B. While the second switch downstream chooses between TCX/IGF or ACELP/TD-BWE output, the first switch either pre-updates the buffers in the resampling QMF stage downstream the ACELP path by the output of the cross path or simply passes on the ACELP output.

Subsequently, audio decoder implementations in accordance with aspects of the present invention are discussed in the context of FIGS. 11A-14C.

An audio decoder for decoding an encoded audio signal 1101 comprises a first decoding processor 1120 for decoding a first encoded audio signal portion in a frequency domain. The first decoding processor 1120 comprises a spectral decoder 1122 for decoding first spectral regions with a high spectral resolution and for synthesizing second spectral regions using a parametric representation of the second spectral regions and at least a decoded first spectral region to obtain a decoded spectral representation. The decoded spectral representation is a full-band decoded spectral representation as discussed in the context of FIG. 6 and as also discussed in the context of FIG. 1A. Generally, the first decoding processor, therefore, comprises a full-band implementation with a gap filling procedure in the frequency domain. The first decoding processor 1120 furthermore comprises a frequency-time converter 1124 for converting the decoded spectral representation into a time domain to obtain a decoded first audio signal portion.

Furthermore, the audio decoder comprises a second decoding processor 1140 for decoding the second encoded audio signal portion in the time domain to obtain a decoded second signal portion. Furthermore, the audio decoder comprises a combiner 1160 for combining the decoded first signal portion and the decoded second signal portion to obtain a decoded audio signal. The decoded signal portions are combined in sequence which is also illustrated in FIG. 14B by a switch implementation 1160 representing an embodiment of the combiner 1160 of FIG. 11A.

Figure 12:
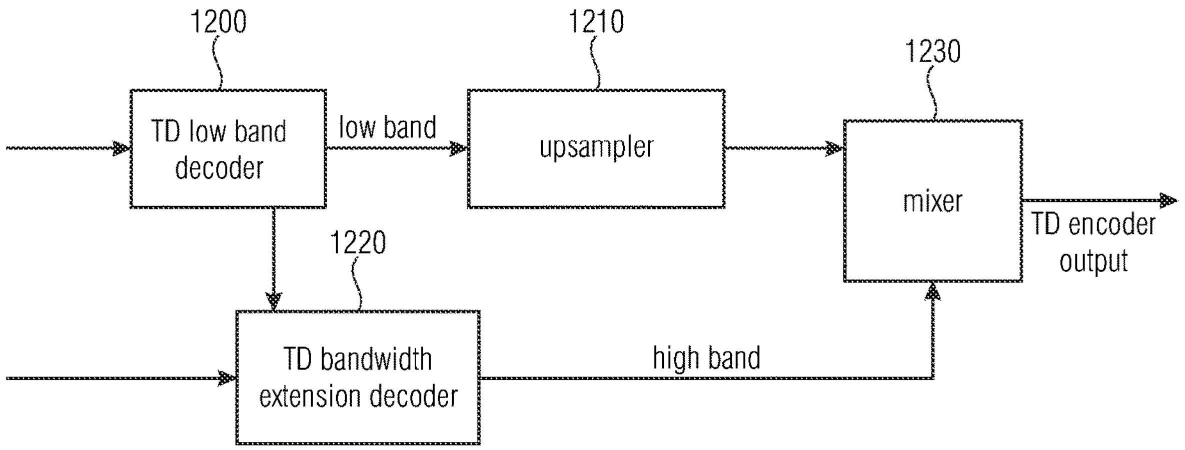
FIG. 12 illustrates an implementation of the time domain decoding processor of FIG. 11A.

Advantageously, the second decoding processor 1140 is a time domain bandwidth extension processor and comprises, as illustrated in FIG. 12, a time domain low band decoder 1200 for decoding a low band time domain signal. This implementation furthermore comprises an upsampler 1210 for upsampling the low band time domain signal. Additionally, a time domain bandwidth extension decoder 1220 is provided for synthesizing a high band of the output audio signal. Furthermore, a mixer 1230 is provided for mixing a synthesized high band of the time domain output signal and an upsampled low band time domain signal to obtain the time domain encoder output. Hence, block 1140 in FIG. 11A can be implemented by the functionality of FIG. 12 in an embodiment.

Figure 13:
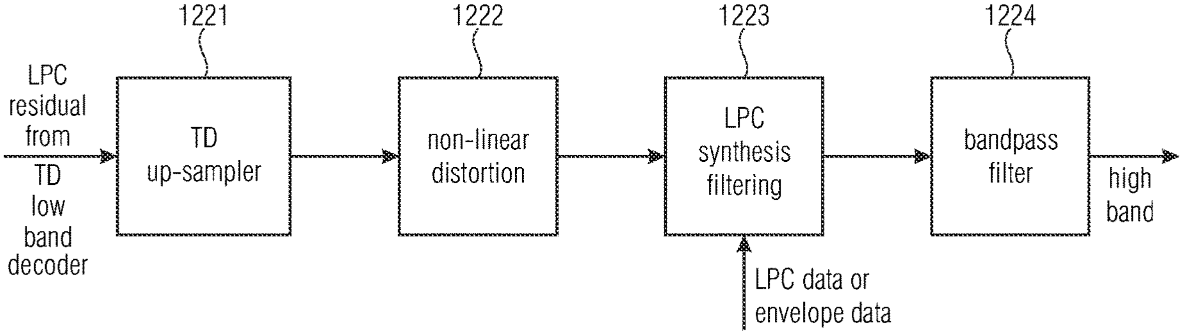
FIG. 13 illustrates a further implementation of the time domain bandwidth extension.

FIG. 13 illustrates an embodiment of the time domain bandwidth extension decoder 1220 of FIG. 12. Advantageously, a time domain upsampler 1221 is provided which receives, as an input, an LPC residual signal from a time domain low band decoder included within block 1140 and illustrated at 1200 in FIG. 12 and further illustrated in the context of FIG. 14B. The time domain upsampler 1221 generates an upsampled version of the LPC residual signal. This version is then input into a non-linear distortion block 1222 which generates, based on its input signal, an output signal having higher frequency values. A non-linear distortion can be a copy-up, a mirroring, a frequency shift or a non-linear device such as a diode or a transistor operated in the non-linear region. The output signal of block 1222 is input into an LPC synthesis filtering block 1223 which is controlled by LPC data used for the low band decoder as well or by specific envelope data generated by the time domain bandwidth extension block 920 on the encoder-side of FIG. 14A, for example. The output of the LPC synthesis block is then input into a bandpass or highpass filter 1224 to finally obtain the high band, which is then input into the mixer 1230 as illustrated in FIG. 12.

Subsequently, an implementation of the upsampler 1210 of FIG. 12 is discussed in the context of FIG. 14B. The upsampler may comprise an analysis filterbank operating at a first time domain low band decoder sampling rate. A specific implementation of such an analysis filterbank is a QMF analysis filterbank 1471 illustrated in FIG. 14B. Furthermore, the upsampler comprises a synthesis filterbank 1473 operating at a second output sampling rate being higher than the first time domain low band sampling rate. Hence, the QMF synthesis filterbank 1473 which is an implementation of the general filterbank operates at the output sampling rate. When the downsampling factor T as discussed in the context of FIG. 7B is 0.5, then the QMF analysis filterbank 1471 has, e.g. only 32 filterbank channels and the QMF synthesis filterbank 1473 has e.g. 64 QMF channels, but the higher half of the filterbank channels, i.e., the upper 32 filterbank channels are fed with zeroes or noise, while the lower 32 filterbank channels are fed with the corresponding signals provided by the QMF analysis filterbank 1471.

Advantageously, however, a bandpass filtering 1472 is performed within the QMF filterbank domain in order to make sure that the QMF synthesis output 1473 is an upsampled version of the ACELP decoder output, but without any artifacts above the maximum frequency of the ACELP decoder.

Further processing operations can be performed within the QMF domain in addition or instead of the bandpass filtering 1472. If no processing is performed at all, then the QMF analysis and the QMF synthesis constitute an efficient upsampler 1210.

Subsequently, the construction of the individual elements in FIG. 14B are discussed in more detail.

The full-band frequency domain decoder 1120 comprises a first decoding block 1122*a* for decoding the high resolution spectral coefficients and for additionally performing noise filling in the low band portion as known, for example, from the USAC technology. Furthermore, the full-band decoder comprises an IGF processor 1122*b* for filling the spectral holes using synthesized spectral values which have been only parametrically and, therefore, encoded with a low resolution on the encoder-side. Then, in block 1122*c*, an inverse noise shaping is performed and the result is input into a TNS/TTS synthesis block 705 which provides, as a final output, an input to a frequency-time converter 1124, which may be implemented as an inverse modified discrete cosine transform operating at the output, i.e., high sampling rate.

Furthermore, a harmonic or LTP post-filter is used which is controlled by data obtained by the TCX LTP parameter extraction block 1006 in FIG. 14B. The result is then the decoded first audio signal portion at the output sampling rate and as can be seen from FIG. 14B, this data has the high sampling rate and, therefore, any further frequency enhancement is not necessary at all due to the fact that the decoding processor is a frequency domain full-band decoder advantageously operating using the intelligent gap filling technology discussed in the context of FIGS. 1A-5C.

Several elements in FIG. 14B are quite similar to the corresponding blocks in the cross-processor 700 of FIG. 14A, particularly with respect to the IGF decoder 704 corresponding to IGF processing 1122*b* and the inverse noise shaping operation controlled by quantized LPC coefficients 1145 corresponds to the inverse noise shaping 703 of FIG. 14A and the TNS/TTS synthesis block 705 in FIG. 14B corresponds to the block TNS/TTS synthesis 705 in FIG. 14A. Importantly, however, the IMDCT block 1124 in FIG.

14B operates at the high sampling rate while the IMDCT block 702 in FIG. 14A operates at a low sampling rate. Hence, the block 1124 in FIG. 14B comprises the large sized transform and fold-out block 710, the synthesis window in block 712 and the overlap-add stage 714 with the corresponding large number of operations, large number of window coefficients and a large transform size compared to the corresponding features 720, 722, 724, which are operated in block 702, and as will be outlined later on, in block 1171 of the cross-processor 1170 in FIG. 14B as well.

The time domain decoding processor 1140 may comprise the ACELP or time domain low band decoder 1200 comprising an ACELP decoder stage 1149 for obtaining decoded gains and the innovative codebook information. Additionally, an ACELP adaptive codebook stage 1141 is provided and a subsequent ACELP post-processing stage 1142 and a final synthesis filter such as LPC synthesis filter 1143, which is again controlled by the quantized LPC coefficients 1145 obtained from the bitstream demultiplexer 1100 corresponding to the encoded signal parser 1100 in FIG. 11A. The output of the LPC synthesis filter 1143 is input into a de-emphasis stage 1144 for canceling or undoing the processing introduced by the pre-emphasis stage 1005 of the pre-processor 1000 of FIG. 14A. The result is the time domain output signal at a low sampling rate and a low band and in case the frequency domain output is necessitated, the switch 1480 is in the indicated position and the output of the de-emphasis stage 1144 is introduced into the upsampler 1210 and then mixed with the high bands from the time domain bandwidth extension decoder 1220.

Figure 11A:
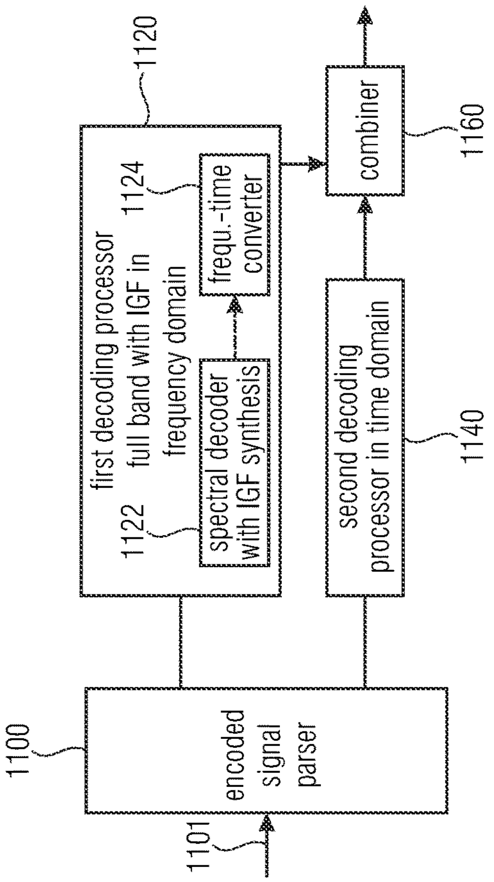
FIG. 11A illustrates a schematic implementation of the audio decoder.
Figure 11B:
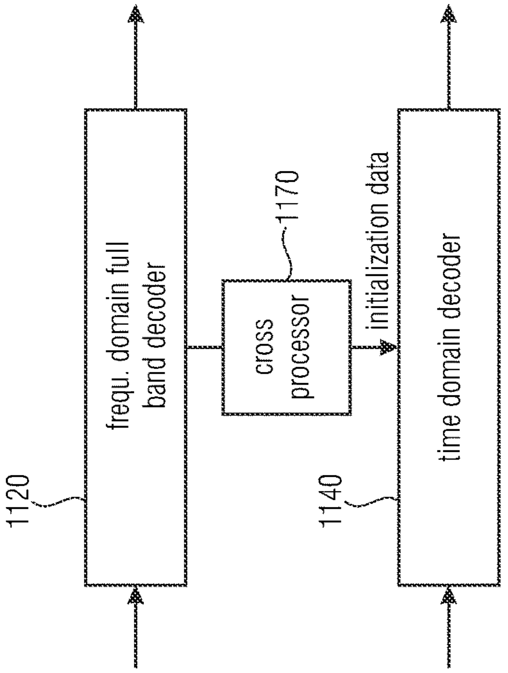
FIG. 11B illustrates a cross-processor within the decoder for providing initialization data for the time domain decoder.

In accordance with embodiments of the present invention, the audio decoder additionally comprises the cross-processor 1170 illustrated in FIG. 11B and in FIG. 14B for calculating, from the decoded spectral representation of the first encoded audio signal portion, initialization data of the second decoding processor so that the second decoding processor is initialized to decode the encoded second audio signal portion following in time the first audio signal portion in the encoded audio signal, i.e., such that the time domain decoding processor 1140 is ready for an instant switch from one audio signal portion to the next without any loss in quality or efficiency.

Advantageously, the cross-processor 1170 comprises an additional frequency-time converter 1171 operating at a lower sampling rate than the frequency-time converter of the first decoding processor in order to obtain a further decoded first signal portion in the time domain to be used as the initialization signal or for which any initialization data can be derived. Advantageously, this IMDCT or low sampling rate frequency-time converter is implemented as illustrated in FIG. 7B, item 726 (selector), item 720 (small-size transform and fold-out), synthesis windowing with a smaller number of window coefficients as indicated in 722 and an overlap-add stage with a smaller number of operations as indicated at 724. Hence, the IMDCT block 1124 in the frequency domain full-band decoder is implemented as indicated by block 710, 712, 714, and the IMDCT block 1171 is implemented as indicated in FIG. 7B by block 726, 720, 722, 724. Again, the downsampling factor is the ratio between the time domain coder sampling rate or the low sampling rate and the higher frequency domain sampling rate or output sampling rate and this downsampling factor is lower than 1 and can be any number greater than 0 and lower than 1.

As illustrated in FIG. 14B, the cross-processor 1170 further comprises, alone or in addition to other elements, a delay stage 1172 for delaying the further decoded first signal portion and for feeding the delayed decoded first signal portion into a de-emphasis stage 1144 of the second decoding processor for initialization. Furthermore, the cross-processor comprises, in addition or alternatively, a pre-emphasis filter 1173 and a delay stage 1175 for filtering and delaying a further decoded first signal portion and for providing the delayed output of block 1175 into an LPC synthesis filtering stage 1143 of the ACELP decoder for the purpose of initialization.

Furthermore, the cross-processor may comprise alternatively or in addition to the other mentioned elements an LPC analysis filter 1174 for generating a prediction residual signal from the further decoded first signal portion or a pre-emphasized further decoded first signal portion and for feeding the data into a codebook synthesizer of the second decoding processor and advantageously, into the adaptive codebook stage 1141. Furthermore, the output of the frequency-time converter 1171 with the low sampling rate is also input into the QMF analysis stage 1471 of the upsampler 1210 for the purpose of initialization, i.e., when the currently decoded audio signal portion is delivered by the frequency domain full-band decoder 1120.

The audio decoder is described in the following: The waveform decoder part consists of a full-band TCX decoder path with IGF both operating at the input sampling rate of the codec. In parallel, an alternative ACELP decoder path at lower sampling rate exists that is reinforced further downstream by a TD-BWE.

For ACELP initialization when switching from TCX to ACELP, a cross path (consisting of a shared TCX decoder frontend but additionally providing output at the lower sampling rate and some post-processing) exists that performs the inventive ACELP initialization. Sharing the same sampling rate and filter order between TCX and ACELP in the LPCs allows for an easier and more efficient ACELP initialization.

For visualizing the switching, two switches are sketched in FIG. 14B. While the second switch downstream chooses between TCX/IGF or ACELP/TD-BWE output, the first switch either pre-updates the buffers in the resampling QMF stage downstream the ACELP path by the output of the cross path or simply passes on the ACELP output.

To summarize, advantageous aspects of the invention which can be used alone or in combination relate to a combination of an ACELP and TD-BWE coder with a full-band capable TCX/IGF technology advantageously associated with using a cross signal.

A further specific feature is a cross signal path for the ACELP initialization to enable seamless switching.

A further aspect is that a short IMDCT is fed with a lower part of high-rate long MDCT coefficients to efficiently implement a sample rate conversion in the cross-path.

A further feature is an efficient realization of the cross-path partly shared with a full-band TCX/IGF in the decoder.

A further feature is the cross signal path for the QMF initialization to enable seamless switching from TCX to ACELP.

An additional feature is a cross-signal path to the QMF allowing compensating the delay gap between ACELP resampled output and a filterbank-TCX/IGF output when switching from ACELP to TCX.

A further aspect is that an LPC is provided for both the TCX and the ACELP coder at the same sampling rate and filter order, although the TCX/IGF encoder/decoder is full-band capable.

Figure 14C:
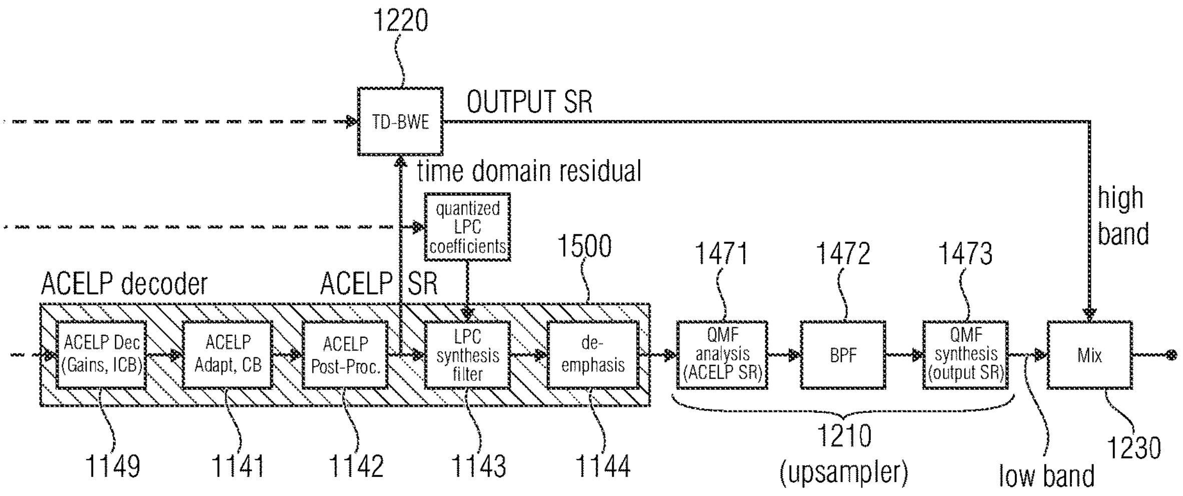
FIG. 14C illustrates an inventive implementation of a time domain decoder with sample rate conversion and bandwidth extension.

Subsequently, FIG. 14C is discussed as an implementation of a time domain decoder operating either as a stand-alone decoder or in the combination with the full-band capable frequency domain decoder.

Generally, the time domain decoder comprises an ACELP decoder, a subsequently connected resampler or upsampler and a time domain bandwidth extension functionality. Particularly, the ACELP decoder comprises an ACELP decoding stage for restoring gains and the innovative codebook 1149, an ACELP-adaptive codebook stage 1141, an ACELP post-processor 1142, an LPC synthesis filter 1143 controlled by quantized LPC coefficients from a bitstream demultiplexer or encoded signal parser and the subsequently connected de-emphasis stage 1144. Advantageously, the time domain residual signal being at an ACELP sampling rate is input into a time domain bandwidth extension decoder 1220 which provides a high band at the outputs.

In order to upsample the de-emphasis 1144 output, an upsampler comprising the QMF analysis block 1471, and the QMF synthesis block 1473 are provided. Within the filterbank domain defined by blocks 1471 and 1473, a bandpass filter may be applied. Particularly, as has been discussed before, the same functionalities can also be used which have been discussed with respect to the same reference numbers. Furthermore, the time domain bandwidth extension decoder 1220 can be implemented as illustrated in FIG. 13 and, generally, comprises an upsampling of the ACELP residual signal or time domain residual signal at the ACELP sampling rate finally to an output sampling rate of the bandwidth extended signal.

Subsequently, further details with respect to the frequency domain encoder and decoder being full-band capable are discussed with respect to FIGS. 1A-5C.

Figure 1A:
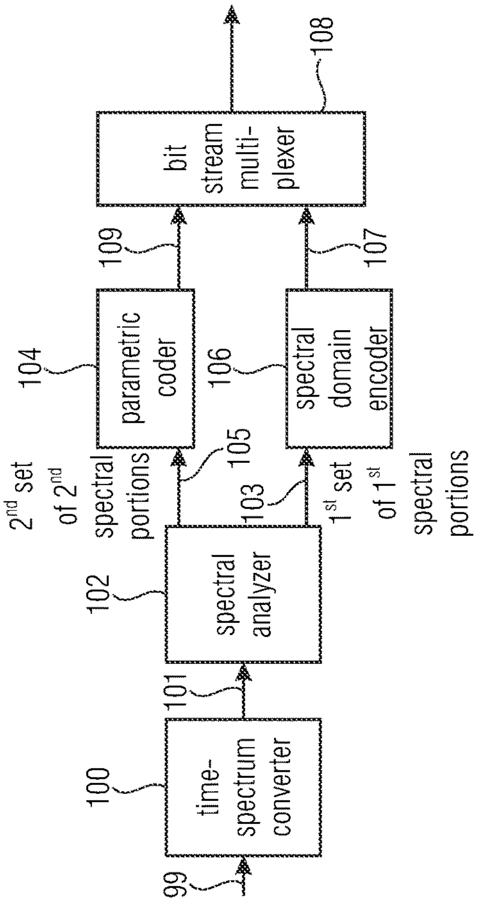
FIG. 1A illustrates an apparatus for encoding an audio signal.

FIG. 1A illustrates an apparatus for encoding an audio signal 99. The audio signal 99 is input into a time spectrum converter 100 for converting an audio signal having a sampling rate into a spectral representation 101 output by the time spectrum converter. The spectrum 101 is input into a spectral analyzer 102 for analyzing the spectral representation 101. The spectral analyzer 101 is configured for determining a first set of first spectral portions 103 to be encoded with a first spectral resolution and a different second set of second spectral portions 105 to be encoded with a second spectral resolution. The second spectral resolution is smaller than the first spectral resolution. The second set of second spectral portions 105 is input into a parameter calculator or parametric coder 104 for calculating spectral envelope information having the second spectral resolution. Furthermore, a spectral domain audio coder 106 is provided for generating a first encoded representation 107 of the first set of first spectral portions having the first spectral resolution. Furthermore, the parameter calculator/parametric coder 104 is configured for generating a second encoded representation 109 of the second set of second spectral portions. The first encoded representation 107 and the second encoded representation 109 are input into a bit stream multiplexer or bit stream former 108 and block 108 finally outputs the encoded audio signal for transmission or storage on a storage device.

Figure 1B:
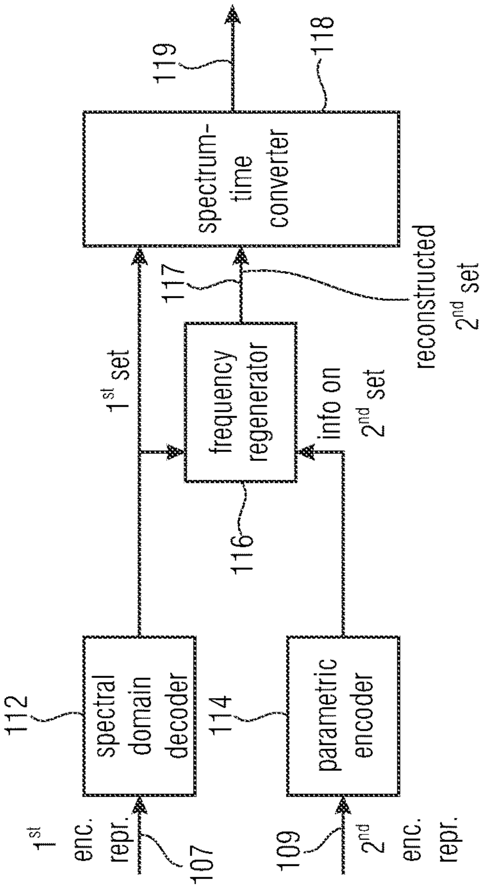
FIG. 1B illustrates a decoder for decoding an encoded audio signal matching with the encoder of FIG. 1A.
Figure 3A:
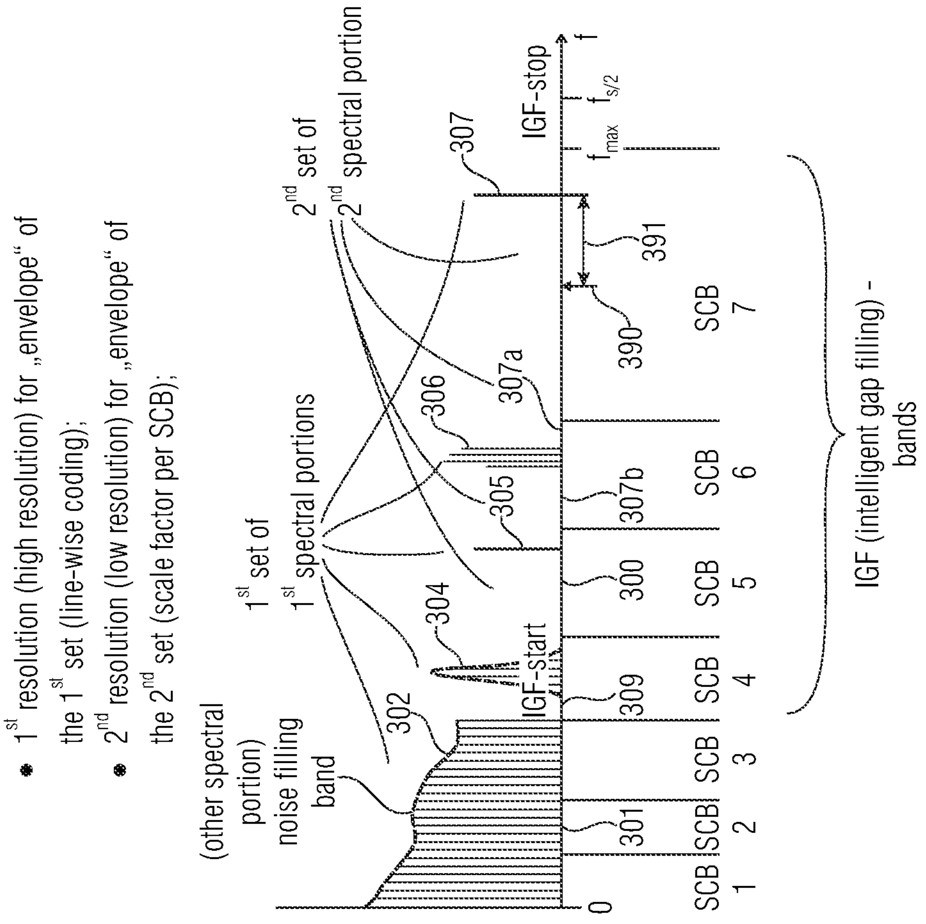
FIG. 3A illustrates a schematic representation of a spectrum as generated by the spectral domain decoder of FIG. 1B.

Typically, a first spectral portion such as 306 of FIG. 3A will be surrounded by two second spectral portions such as 307*a*, 307*b*. This is not the case in HE AAC, where the core coder frequency range is band limited FIG. 1B illustrates a decoder matching with the encoder of FIG. 1A. The first encoded representation 107 is input into a spectral domain audio decoder 112 for generating a first decoded representation of a first set of first spectral portions, the decoded representation having a first spectral resolution. Furthermore, the second encoded representation 109 is input into a parametric decoder 114 for generating a second decoded representation of a second set of second spectral portions having a second spectral resolution being lower than the first spectral resolution.

The decoder further comprises a frequency regenerator 116 for regenerating a reconstructed second spectral portion having the first spectral resolution using a first spectral portion. The frequency regenerator 116 performs a tile filling operation, i.e., uses a tile or portion of the first set of first spectral portions and copies this first set of first spectral portions into the reconstruction range or reconstruction band having the second spectral portion and typically performs spectral envelope shaping or another operation as indicated by the decoded second representation output by the parametric decoder 114, i.e., by using the information on the second set of second spectral portions. The decoded first set of first spectral portions and the reconstructed second set of spectral portions as indicated at the output of the frequency regenerator 116 on line 117 is input into a spectrum-time converter 118 configured for converting the first decoded representation and the reconstructed second spectral portion into a time representation 119, the time representation having a certain high sampling rate.

Figure 2A:
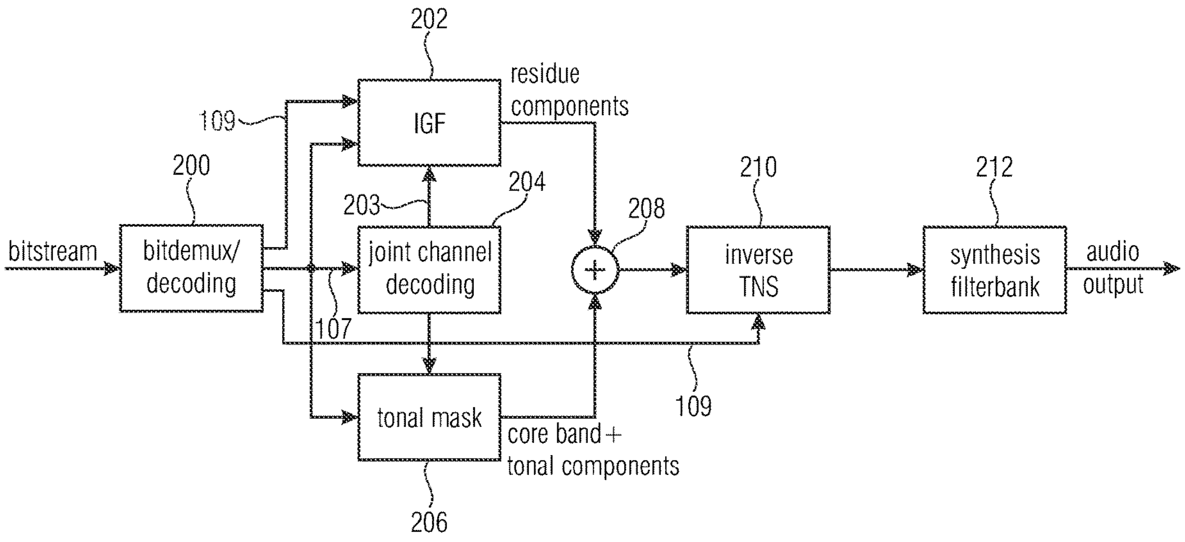
FIG. 2A illustrates an implementation of the decoder.
Figure 2B:
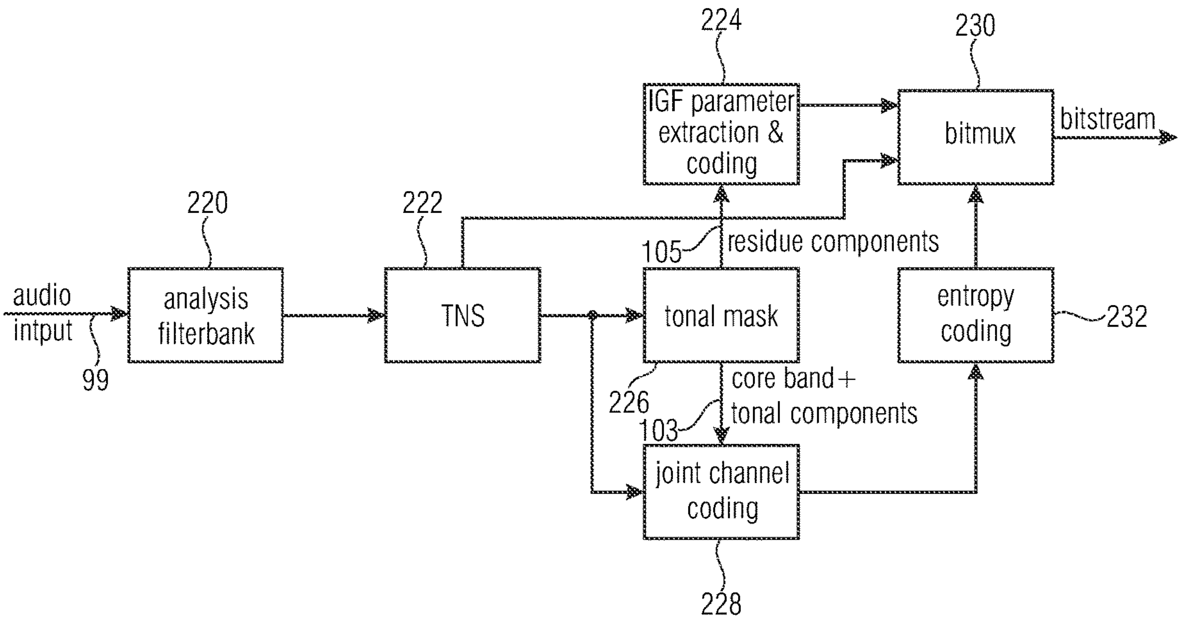
FIG. 2B illustrates an implementation of the encoder.

FIG. 2B illustrates an implementation of the FIG. 1A encoder. An audio input signal 99 is input into an analysis filterbank 220 corresponding to the time spectrum converter 100 of FIG. 1A. Then, a temporal noise shaping operation is performed in TNS block 222. Therefore, the input into the spectral analyzer 102 of FIG. 1A corresponding to a block tonal mask 226 of FIG. 2B can either be full spectral values, when the temporal noise shaping/temporal tile shaping operation is not applied or can be spectral residual values, when the TNS operation as illustrated in FIG. 2B, block 222 is applied. For two-channel signals or multi-channel signals, a joint channel coding 228 can additionally be performed, so that the spectral domain encoder 106 of FIG. 1A may comprise the joint channel coding block 228. Furthermore, an entropy coder 232 for performing a lossless data compression is provided which is also a portion of the spectral domain encoder 106 of FIG. 1A.

The spectral analyzer/tonal mask 226 separates the output of TNS block 222 into the core band and the tonal components corresponding to the first set of first spectral portions 103 and the residual components corresponding to the second set of second spectral portions 105 of FIG. 1A. The block 224 indicated as IGF parameter extraction encoding corresponds to the parametric coder 104 of FIG. 1A and the bitstream multiplexer 230 corresponds to the bitstream multiplexer 108 of FIG. 1A.

Advantageously, the analysis filterbank 222 is implemented as an MDCT (modified discrete cosine transform filterbank) and the MDCT is used to transform the signal 99 into a time-frequency domain with the modified discrete cosine transform acting as the frequency analysis tool.

The spectral analyzer 226 may apply a tonality mask. This tonality mask estimation stage is used to separate tonal components from the noise-like components in the signal. This allows the core coder 228 to code all tonal components with a psycho-acoustic module. The tonality mask estimation stage can be implemented in numerous different ways and may be implemented similar in its functionality to the sinusoidal track estimation stage used in sine and noise-modeling for speech/audio coding [8, 9] or an HILN model based audio coder described in [10]. Advantageously, an implementation is used which is easy to implement without the need to maintain birth-death trajectories, but any other tonality or noise detector can be used as well.

The IGF module calculates the similarity that exists between a source region and a target region. The target region will be represented by the spectrum from the source region. The measure of similarity between the source and target regions is done using a cross-correlation approach. The target region is split into nTar non-overlapping frequency tiles. For every tile in the target region, nSre source tiles are created from a fixed start frequency. These source tiles overlap by a factor between 0 and 1, where 0 means 0% overlap and 1 means 100% overlap. Each of these source tiles is correlated with the target tile at various lags to find the source tile that best matches the target tile. The best matching tile number is stored in tileNum[idx_tar], the lag at which it best correlates with the target is stored in xcorr_lag[idx_tar][idx_src] and the sign of the correlation is stored in xcorr_sign[idy_tar][idx_src]. In case the correlation is highly negative, the source tile needs to be multiplied by −1 before the tile filling process at the decoder. The IGF module also takes care of not overwriting the tonal components in the spectrum since the tonal components are preserved using the tonality mask. A band-wise energy parameter is used to store the energy of the target region enabling us to reconstruct the spectrum accurately.

This method has certain advantages over the classical SBR [1] in that the harmonic grid of a multi-tone signal is preserved by the core coder while only the gaps between the sinusoids is filled with the best matching "shaped noise" from the source region. Another advantage of this system compared to ASR (Accurate Spectral Replacement) [2-4] is the absence of a signal synthesis stage which creates the important portions of the signal at the decoder. Instead, this task is taken over by the core coder, enabling the preservation of important components of the spectrum. Another advantage of the proposed system is the continuous scalability that the features offer. Just using tileNun[idx_tar] and xcorr_lng=0, for every tile is called gross granularity matching and can be used for low bitrates while using variable xcorr_lag for every tile enables us to match the target and source spectra better.

In addition, a tile choice stabilization technique is proposed which removes frequency domain artifacts such as trilling and musical noise.

In case of stereo channel pairs an additional joint stereo processing is applied. This is done, because for a certain destination range the signal can a highly correlated panned sound source. In case the source regions chosen for this particular region are not well correlated, although the energies are matched for the destination regions, the spatial image can suffer due to the uncorrelated source regions. The encoder analyses each destination region energy band, typically performing a cross-correlation of the spectral values and if a certain threshold is exceeded, sets a joint flag for this energy band. In the decoder the left and right channel energy bands are treated individually if this joint stereo flag is not set. In case the joint stereo flag is set, both the energies and the patching are performed in the joint stereo domain. The joint stereo information for the IGF regions is signaled similar the joint stereo information for the core coding, including a flag indicating in case of prediction if the direction of the prediction is from downmix to residual or vice versa.

The energies can be calculated from the transmitted energies in the L/R-domain.

$$\text{midNrg}[k]-\text{leftNrg}[k]+\text{rightNrg}[k];$$

$$\text{sideNrg}[k]=\text{leftNrg}[k]-\text{rightNrg}[k];$$

with k being the frequency index in the transform domain.

Another solution is to calculate and transmit the energies directly in the joint stereo domain for bands where joint stereo is active, so no additional energy transformation is needed at the decoder side.

The source tiles are created according to the Mid/Side-Matrix:

$$\text{midTile}[k]=0.5\cdot(\text{leftTile}[k]+\text{rightTile}[k])$$

$$\text{sideTile}[k]=0.5\cdot(\text{leftTile}[k]-\text{rightTile}[k])$$

Energy Adjustment:

$$\text{midTile}[k]=\text{midTile}[k]\cdot\text{midNrg}[k];$$

$$\text{sideTile}[k]=\text{sideTile}[k]*\text{sideNrg}[k];$$

Joint Stereo→LR Transformation:

If no additional prediction parameter is coded:

$$\text{leftTile}[k]=\text{midTile}[k]+\text{side Tile}[k]$$

$$\text{rightTile}[k]=\text{midTile}[k]-\text{sideTile}[k]$$

If an additional prediction parameter is coded and if the signalled direction is from mid to side:

$$\text{sideTile}[k]=\text{sideTile}[k]-\text{prediction Coeff}\cdot\text{midTile}[k]$$

$$\text{leftTile}[k]=\text{midTile}[k]+\text{side Tile}[k]$$

$$\text{rightTile}[k]=\text{midTile}[k]-\text{sideTile}[k]$$

If the signalled direction is from side to mid:

$$\text{midTile1}[k]=\text{midTile}[k]-\text{prediction Coeff}\cdot\text{sideTile}[k]$$

$$\text{leftTile}[k]=\text{midTile1}[k]-\text{sideTile}[k]$$

$$\text{rightTile}[k]=\text{midTile1}[k]+\text{sideTile}[k]$$

This processing ensures that from the tiles used for regenerating highly correlated destination regions and panned destination regions, the resulting left and right channels still represent a correlated and panned sound source even if the source regions are not correlated, preserving the stereo image for such regions.

In other words, in the bitstream, joint stereo flags are transmitted that indicate whether L/R or M/S as an example for the general joint stereo coding shall be used. In the decoder, first, the core signal is decoded as indicated by the joint stereo flags for the core bands. Second, the core signal is stored in both L/R and M/S representation. For the IGF tile filling, the source tile representation is chosen to fit the target tile representation as indicated by the joint stereo information for the IGF bands.

Temporal Noise Shaping (TNS) is a standard technique and part of AAC [11-13]. TNS can be considered as an extension of the basic scheme of a perceptual coder, inserting an optional processing step between the filterbank and the quantization stage. The main task of the TNS module is to hide the produced quantization noise in the temporal masking region of transient like signals and thus it leads to a more efficient coding scheme. First, TNS calculates a set of prediction coefficients using "forward prediction" in the transform domain, e.g. MDCT. These coefficients are then used for flattening the temporal envelope of the signal. As the quantization affects the TNS filtered spectrum, also the quantization noise is temporarily flat. By applying the invers TNS filtering on decoder side, the quantization noise is shaped according to the temporal envelope of the TNS filter and therefore the quantization noise gets masked by the transient.

IGF is based on an MDCT representation. For efficient coding, advantageously long blocks of approx. 20 ms have to be used. If the signal within such a long block contains transients, audible pre- and post-echoes occur in the IGF spectral bands due to the tile filling. FIG. 7C shows a typical pre-echo effect before the transient onset due to IGF. On the left side, the spectrogram of the original signal is shown and on the right side the spectrogram of the bandwidth extended signal without TNS filtering is shown.

This pre-echo effect is reduced by using TNS in the IGF context. Here, TNS is used as a temporal tile shaping (TTS) tool as the spectral regeneration in the decoder is performed on the TNS residual signal. The necessitated TTS prediction coefficients are calculated and applied using the full spectrum on encoder side as usual. The TNS/TTS start and stop frequencies are not affected by the IGF start frequency $f_{IGFstart}$ of the IGF tool. In comparison to the legacy TNS, the TTS stop frequency is increased to the stop frequency of the IGF tool, which is higher than $f_{IGFstart}$. On decoder side the TNS/TTS coefficients are applied on the full spectrum again, i.e. the core spectrum plus the regenerated spectrum plus the tonal components from the tonality map (see FIG. 7E). The application of TTS is done to form the temporal envelope of the regenerated spectrum to match the envelope of the original signal again. So the shown pre-echoes are reduced. In addition, it still shapes the quantization noise in the signal below $f_{IGFstart}$ as usual with TNS.

In legacy decoders, spectral patching on an audio signal corrupts spectral correlation at the patch borders and thereby impairs the temporal envelope of the audio signal by introducing dispersion. Hence, another benefit of performing the IGF tile filling on the residual signal is that, after application of the shaping filter, tile borders are seamlessly correlated, resulting in a more faithful temporal reproduction of the signal.

In an inventive encoder, the spectrum having undergone TNS/TTS filtering, tonality mask processing and IGF parameter estimation is devoid of any signal above the IGF start frequency except for tonal components. This sparse spectrum is now coded by the core coder using principles of arithmetic coding and predictive coding. These coded components along with the signaling bits form the bitstream of the audio.

FIG. 2A illustrates the corresponding decoder implementation. The bitstream in FIG. 2A corresponding to the encoded audio signal is input into the demultiplexer/decoder which would be connected, with respect to FIG. 1B, to the blocks 112 and 114. The bitstream demultiplexer separates the input audio signal into the first encoded representation 107 of FIG. 1B and the second encoded representation 109 of FIG. 1B. The first encoded representation having the first set of first spectral portions is input into the joint channel decoding block 204 corresponding to the spectral domain decoder 112 of FIG. 1B. The second encoded representation is input into the parametric decoder 114 not illustrated in FIG. 2A and then input into the IGF block 202 corresponding to the frequency regenerator 116 of FIG. 1B. The first set of first spectral portions necessitated for frequency regeneration are input into IGF block 202 via line 203. Furthermore, subsequent to joint channel decoding 204 the specific core decoding is applied in the tonal mask block 206 so that the output of tonal mask 206 corresponds to the output of the spectral domain decoder 112. Then, a combination by combiner 208 is performed, i.e., a frame building where the output of combiner 208 now has the full range spectrum, but still in the TNS/TTS filtered domain. Then, in block 210, an inverse TNS/TTS operation is performed using TNS/TTS filter information provided via line 109, i.e., the TTS side information may be included in the first encoded representation generated by the spectral domain encoder 106 which can, for example, be a straightforward AAC or USAC core encoder, or can also be included in the second encoded representation. At the output of block 210, a complete spectrum until the maximum frequency is provided which is the full range frequency defined by the sampling rate of the original input signal. Then, a spectrum/time conversion is performed in the synthesis filterbank 212 to finally obtain the audio output signal.

FIG. 3A illustrates a schematic representation of the spectrum. The spectrum is subdivided in scale factor bands SCB where there are seven scale factor bands SCB1 to SCB7 in the illustrated example of FIG. 3A. The scale factor bands can be AAC scale factor bands which are defined in the AAC standard and have an increasing bandwidth to upper frequencies as illustrated in FIG. 3A schematically. It is of advantage to perform intelligent gap filling not from the very beginning of the spectrum, i.e., at low frequencies, but to start the IGF operation at an IGF start frequency illustrated at 309. Therefore, the core frequency band extends from the lowest frequency to the IGF start frequency. Above the IGF start frequency, the spectrum analysis is applied to separate high resolution spectral components 304, 305, 306, 307 (the first set of first spectral portions) from low resolution components represented by the second set of second spectral portions. FIG. 3A illustrates a spectrum which is exemplarily input into the spectral domain encoder 106 or the joint channel coder 228, i.e., the core encoder operates in the full range, but encodes a significant amount of zero spectral values, i.e., these zero spectral values are quantized to zero or are set to zero before quantizing or subsequent to quantizing. Anyway, the core encoder operates in full range, i.e., as if the spectrum would be as illustrated, i.e., the core decoder does not necessarily have to be aware of any intelligent gap filling or encoding of the second set of second spectral portions with a lower spectral resolution.

Advantageously, the high resolution is defined by a line-wise coding of spectral lines such as MDCT lines, while the second resolution or low resolution is defined by, for example, calculating only a single spectral value per scale factor band, where a scale factor band covers several frequency lines. Thus, the second low resolution is, with respect to its spectral resolution, much lower than the first or high resolution defined by the line-wise coding typically applied by the core encoder such as an AAC or USAC core encoder.

Figure 3B:
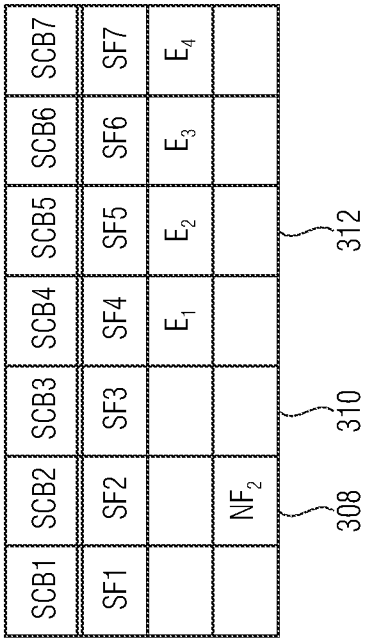
FIG. 3B illustrates a table indicating the relation between scale factors for scale factor bands and energies for reconstruction bands and noise filling information for a noise filling band.

Regarding scale factor or energy calculation, the situation is illustrated in FIG. 3B. Due to the fact that the encoder is a core encoder and due to the fact that there can, but does not necessarily have to be, components of the first set of spectral portions in each band, the core encoder calculates a scale factor for each band not only in the core range below the IGF start frequency 309, but also above the IGF start frequency until the maximum frequency $f_{IGFstop}$ which is smaller or equal to the half of the sampling frequency, i.e., $f_{s/2}$. Thus, the encoded tonal portions 302, 304, 305, 306, 307 of FIG. 3A and, in this embodiment together with the scale factors SCB1 to SCB7 correspond to the high resolution spectral data. The low resolution spectral data are calculated starting from the IGF start frequency and correspond to the energy information values $E_1$, $E_2$, $E_3$, $E_4$, which are transmitted together with the scale factors SF4 to SF7.

Particularly, when the core encoder is under a low bitrate condition, an additional noise-filling operation in the core band, i.e., lower in frequency than the IGF start frequency, i.e., in scale factor bands SCB1 to SCB3 can be applied in addition. In noise-filling, there exist several adjacent spectral lines which have been quantized to zero. On the decoder-side, these quantized to zero spectral values are re-synthesized and the re-synthesized spectral values are adjusted in their magnitude using a noise-filling energy such as $NF_2$ illustrated at 308 in FIG. 3B. The noise-filling energy, which can be given in absolute terms or in relative terms particularly with respect to the scale factor as in USAC corresponds to the energy of the set of spectral values quantized to zero. These noise-filling spectral lines can also be considered to be a third set of third spectral portions which are regenerated by straightforward noise-filling synthesis without any IGF operation relying on frequency regeneration using frequency tiles from other frequencies for reconstructing frequency tiles using spectral values from a source range and the energy information $E_1$, $E_2$, $E_3$, $E_4$.

Advantageously, the bands, for which energy information is calculated coincide with the scale factor bands. In other embodiments, an energy information value grouping is applied so that, for example, for scale factor bands 4 and 5, only a single energy information value is transmitted, but even in this embodiment, the borders of the grouped reconstruction bands coincide with borders of the scale factor bands. If different band separations are applied, then certain re-calculations or synchronization calculations may be applied, and this can make sense depending on the certain implementation.

Figure 4A:
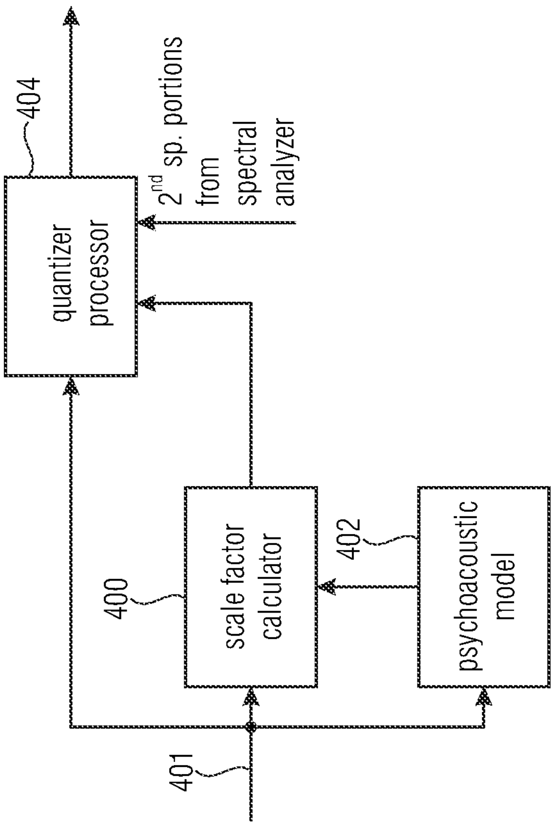
FIG. 4A illustrates the functionality of the spectral domain encoder for applying the selection of spectral portions into the first and second sets of spectral portions.

Advantageously, the spectral domain encoder 106 of FIG. 1A is a psycho-acoustically driven encoder as illustrated in FIG. 4A. Typically, as for example illustrated in the MPEG2/4 AAC standard or MPEG1/2, Layer 3 standard, the to be encoded audio signal after having been transformed into the spectral range (401 in FIG. 4A) is forwarded to a scale factor calculator 400. The scale factor calculator is controlled by a psycho-acoustic model additionally receiving the to be quantized audio signal or receiving, as in the MPEG1/2 Layer 3 or MPEG AAC standard, a complex spectral representation of the audio signal. The psycho-acoustic model calculates, for each scale factor band, a scale factor representing the psycho-acoustic threshold. Additionally, the scale factors are then, by cooperation of the well-known inner and outer iteration loops or by any other suitable encoding procedure adjusted so that certain bitrate conditions are fulfilled. Then, the to be quantized spectral values on the one hand and the calculated scale factors on the other hand are input into a quantizer processor 404. In the straightforward audio encoder operation, the to be quantized spectral values are weighted by the scale factors and, the weighted spectral values are then input into a fixed quantizer typically having a compression functionality to upper amplitude ranges. Then, at the output of the quantizer processor there do exist quantization indices which are then forwarded into an entropy encoder typically having specific and very efficient coding for a set of zero-quantization indices for adjacent frequency values or, as also called in the art, a "run" of zero values.

In the audio encoder of FIG. 1A, however, the quantizer processor typically receives information on the second spectral portions from the spectral analyzer. Thus, the quantizer processor 404 makes sure that, in the output of the quantizer processor 404, the second spectral portions as identified by the spectral analyzer 102 are zero or have a representation acknowledged by an encoder or a decoder as a zero representation which can be very efficiently coded, specifically when there exist "runs" of zero values in the spectrum.

Figure 4B:
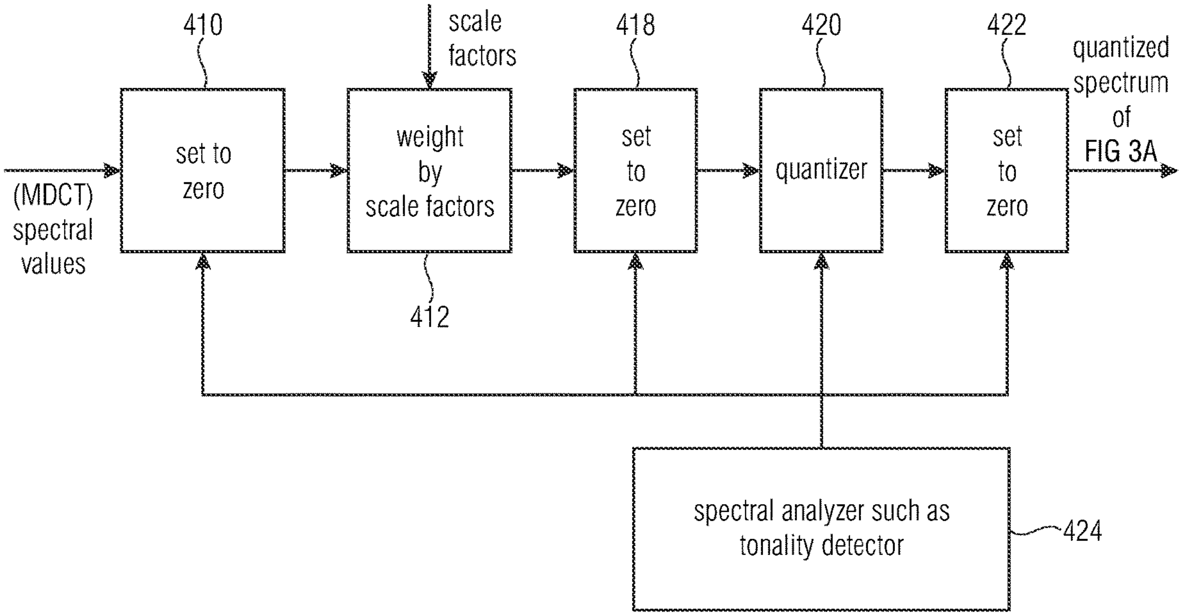
FIG. 4B illustrates an implementation of the functionality of FIG. 4A.

FIG. 4B illustrates an implementation of the quantizer processor. The MDCT spectral values can be input into a set to zero block 410. Then, the second spectral portions are already set to zero before a weighting by the scale factors in block 412 is performed. In an additional implementation, block 410 is not provided, but the set to zero cooperation is performed in block 418 subsequent to the weighting block 412. In an even further implementation, the set to zero operation can also be performed in a set to zero block 422 subsequent to a quantization in the quantizer block 420. In this implementation, blocks 410 and 418 would not be present. Generally, at least one of the blocks 410, 418, 422 are provided depending on the specific implementation.

Then, at the output of block 422, a quantized spectrum is obtained corresponding to what is illustrated in FIG. 3A. This quantized spectrum is then input into an entropy coder such as 232 in FIG. 2B which can be a Huffman coder or an arithmetic coder as, for example, defined in the USAC standard.

The set to zero blocks 410, 418, 422, which are provided alternatively to each other or in parallel are controlled by the spectral analyzer 424. The spectral analyzer may comprise any implementation of a well-known tonality detector or comprises any different kind of detector operative for separating a spectrum into components to be encoded with a high resolution and components to be encoded with a low resolution. Other such algorithms implemented in the spectral analyzer can be a voice activity detector, a noise detector, a speech detector or any other detector deciding, depending on spectral information or associated metadata on the resolution requirements for different spectral portions.

Figure 5A:
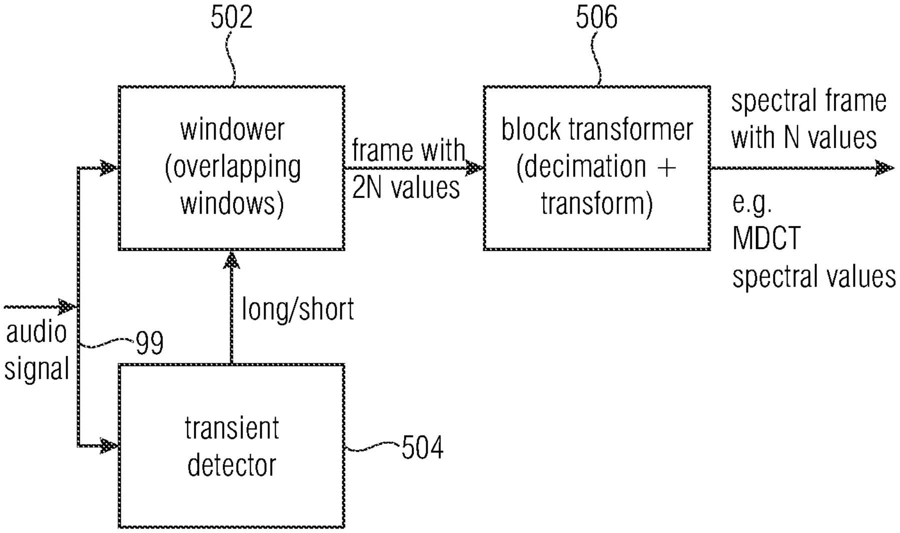
FIG. 5A illustrates a functionality of an MDCT encoder.

FIG. 5A illustrates an implementation of the time spectrum converter 100 of FIG. 1A as, for example, implemented in AAC or USAC. The time spectrum converter 100 comprises a windower 502 controlled by a transient detector 504. When the transient detector 504 detects a transient, then a switchover from long windows to short windows is signaled to the windower. The windower 502 then calculates, for overlapping blocks, windowed frames, where each windowed frame typically has two N values such as 2048 values. Then, a transformation within a block transformer 506 is performed, and this block transformer typically additionally provides a decimation, so that a combined decimation/transform is performed to obtain a spectral frame with N values such as MDCT spectral values. Thus, for a long window operation, the frame at the input of block 506 comprises two N values such as 2048 values and a spectral frame then has 1024 values. Then, however, a switch is performed to short blocks, when eight short blocks are performed where each short block has ⅛ windowed time domain values compared to a long window and each spectral block has ⅛ spectral values compared to a long block. Thus, when this decimation is combined with a 50% overlap operation of the windower, the spectrum is a critically sampled version of the time domain audio signal 99.

Figure 5B:
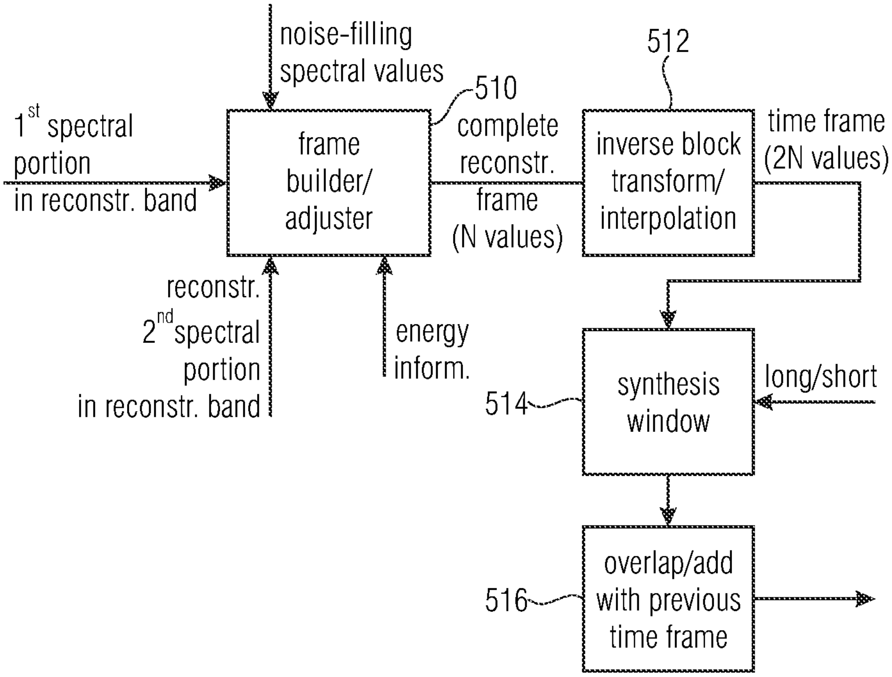
FIG. 5B illustrates a functionality of the decoder with an MDCT technology.

Subsequently, reference is made to FIG. 5B illustrating a specific implementation of frequency regenerator 116 and the spectrum-time converter 118 of FIG. 1B, or of the combined operation of blocks 208, 212 of FIG. 2A. In FIG. 5B, a specific reconstruction band is considered such as scale factor band 6 of FIG. 3A. The first spectral portion in this reconstruction band, i.e., the first spectral portion 306 of FIG. 3A is input into the frame builder/adjustor block 510. Furthermore, a reconstructed second spectral portion for the scale factor band 6 is input into the frame builder/adjuster 510 as well. Furthermore, energy information such as $E_3$ of FIG. 3B for a scale factor band 6 is also input into block 510.

The reconstructed second spectral portion in the reconstruction band has already been generated by frequency tile filling using a source range and the reconstruction band then corresponds to the target range. Now, an energy adjustment of the frame is performed to then finally obtain the complete reconstructed frame having the N values as, for example, obtained at the output of combiner 208 of FIG. 2A. Then, in block 512, an inverse block transform/interpolation is performed to obtain 248 time domain values for the for example 124 spectral values at the input of block 512. Then, a synthesis windowing operation is performed in block 514 which is again controlled by a long window/short window indication transmitted as side information in the encoded audio signal. Then, in block 516, an overlap/add operation with a previous time frame is performed. Advantageously, MDCT applies a 50% overlap so that, for each new time frame of 2N values, N time domain values are finally output. A 50% overlap is heavily of advantage due to the fact that it provides critical sampling and a continuous crossover from one frame to the next frame due to the overlap/add operation in block 516.

As illustrated at 301 in FIG. 3A, a noise-filling operation can additionally be applied not only below the IGF start frequency, but also above the IGF start frequency such as for the contemplated reconstruction band coinciding with scale factor band 6 of FIG. 3A. Then, noise-filling spectral values can also be input into the frame builder/adjuster 510 and the adjustment of the noise-filling spectral values can also be applied within this block or the noise-filling spectral values can already be adjusted using the noise-filling energy before being input into the frame builder/adjuster 510.

Advantageously, an IGF operation, i.e., a frequency tile filling operation using spectral values from other portions can be applied in the complete spectrum. Thus, a spectral tile filling operation can not only be applied in the high band above an IGF start frequency but can also be applied in the low band. Furthermore, the noise-filling without frequency tile filling can also be applied not only below the IGF start frequency but also above the IGF start frequency. It has, however, been found that high quality and high efficient audio encoding can be obtained when the noise-filling operation is limited to the frequency range below the IGF start frequency and when the frequency tile filling operation is restricted to the frequency range above the IGF start frequency as illustrated in FIG. 3A.

Advantageously, the target tiles (TT) (having frequencies greater than the IGF start frequency) are bound to scale factor band borders of the full rate coder. Source tiles (ST), from which information is taken, i.e., for frequencies lower than the IGF start frequency are not bound by scale factor band borders. The size of the ST should correspond to the size of the associated TT. This is illustrated using the following example. TT[0] has a length of 10 MDCT Bins. This exactly corresponds to the length of two subsequent SCBs (such as 4+6). Then, all possible ST that are to be correlated with TT[0], have a length of 10 bins, too. A second target tile TT[1] being adjacent to TT[0] has a length of 15 bins I (SCB having a length of 7+8). Then, the ST for that have a length of 15 bins rather than 10 bins as for TT[0].

Should the case arise that one cannot find a TT for an ST with the length of the target tile (when e.g. the length of TT is greater than the available source range), then a correlation is not calculated and the source range is copied a number of times into this TT (the copying is done one after the other so that a frequency line for the lowest frequency of the second copy immediately follows—in frequency–the frequency line for the highest frequency of the first copy), until the target tile TT is completely filled up.

Figure 5C:
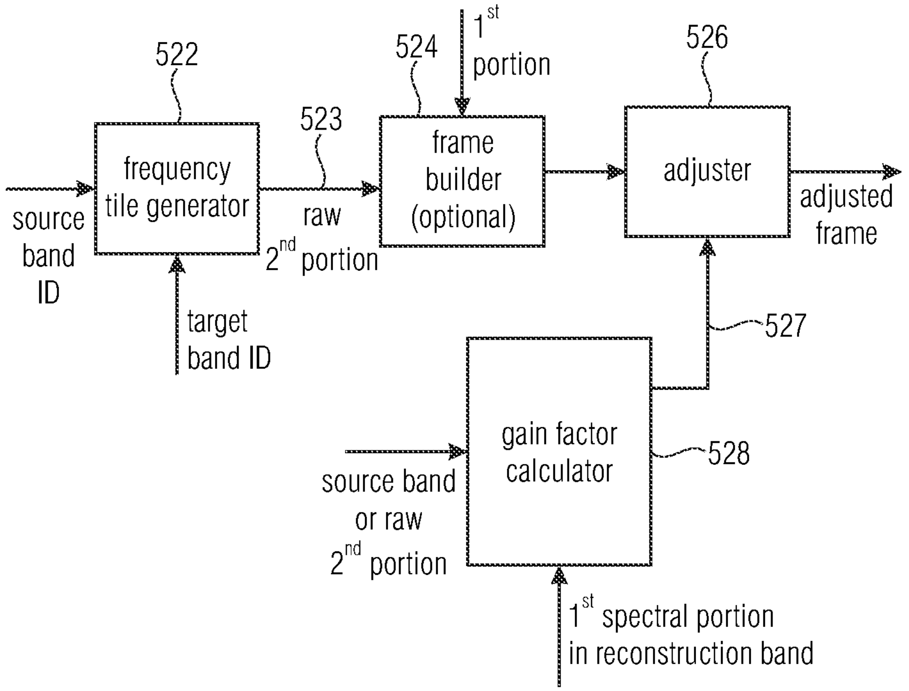
FIG. 5C illustrates an implementation of the frequency regenerator.

Subsequently, reference is made to FIG. 5C illustrating a further embodiment of the frequency regenerator 116 of FIG. 1B or the IGF block 202 of FIG. 2A. Block 522 is a frequency tile generator receiving, not only a target band ID, but additionally receiving a source band ID. Exemplarily, it has been determined on the encoder-side that the scale factor band 3 of FIG. 3A is very well suited for reconstructing scale factor band 7. Thus, the source band ID would be 2 and the target band ID would be 7. Based on this information, the frequency tile generator 522 applies a copy up or harmonic tile filling operation or any other tile filling operation to generate the raw second portion of spectral components 523. The raw second portion of spectral components has a frequency resolution identical to the frequency resolution included in the first set of first spectral portions.

Then, the first spectral portion of the reconstruction band such as 307 of FIG. 3A is input into a frame builder 524 and the raw second portion 523 is also input into the frame builder 524. Then, the reconstructed frame is adjusted by the adjuster 526 using a gain factor for the reconstruction band calculated by the gain factor calculator 528. Importantly, however, the first spectral portion in the frame is not influenced by the adjuster 526, but only the raw second portion for the reconstruction frame is influenced by the adjuster 526. To this end, the gain factor calculator 528 analyzes the source band or the raw second portion 523 and additionally analyzes the first spectral portion in the reconstruction band to finally find the correct gain factor 527 so that the energy of the adjusted frame output by the adjuster 526 has the energy $E_4$ when a scale factor band 7 is contemplated.

In this context, it is very important to evaluate the high frequency reconstruction accuracy of the present invention compared to HE-AAC. This is explained with respect to scale factor band 7 in FIG. 3A. It is assumed that a known encoder such as illustrated in FIG. 13A would detect the spectral portion 307 to be encoded with a high resolution as a “missing harmonics”. Then, the energy of this spectral component would be transmitted together with a spectral envelope information for the reconstruction band such as scale factor band 7 to the decoder. Then, the decoder would recreate the missing harmonic. However, the spectral value, at which the missing harmonic 307 would be reconstructed by the known decoder of FIG. 13B would be in the middle of band 7 at a frequency indicated by reconstruction frequency 390. Thus, the present invention avoids a frequency error 391 which would be introduced by the known decoder of FIG. 13D.

In an implementation, the spectral analyzer is also implemented to calculating similarities between first spectral portions and second spectral portions and to determine, based on the calculated similarities, for a second spectral portion in a reconstruction range a first spectral portion matching with the second spectral portion as far as possible. Then, in this variable source range/destination range implementation, the parametric coder will additionally introduce into the second encoded representation a matching information indicating for each destination range a matching source range. On the decoder-side, this information would then be used by a frequency tile generator 522 of FIG. 5C illustrating a generation of a raw second portion 523 based on a source band ID and a target band ID.

Furthermore, as illustrated in FIG. 3A, the spectral analyzer is configured to analyze the spectral representation up to a maximum analysis frequency being only a small amount below half of the sampling frequency and advantageously being at least one quarter of the sampling frequency or typically higher.

As illustrated, the encoder operates without downsampling and the decoder operates without upsampling. In other words, the spectral domain audio coder is configured to generate a spectral representation having a Nyquist frequency defined by the sampling rate of the originally input audio signal.

Furthermore, as illustrated in FIG. 3A, the spectral analyzer is configured to analyze the spectral representation starting with a gap filling start frequency and ending with a maximum frequency represented by a maximum frequency included in the spectral representation, wherein a spectral portion extending from a minimum frequency up to the gap filling start frequency belongs to the first set of spectral portions and wherein a further spectral portion such as 304, 305, 306, 307 having frequency values above the gap filling frequency additionally is included in the first set of first spectral portions.

As outlined, the spectral domain audio decoder 112 is configured so that a maximum frequency represented by a spectral value in the first decoded representation is equal to a maximum frequency included in the time representation having the sampling rate wherein the spectral value for the maximum frequency in the first set of first spectral portions is zero or different from zero. Anyway, for this maximum frequency in the first set of spectral components a scale factor for the scale factor band exists, which is generated and transmitted irrespective of whether all spectral values in this scale factor band are set to zero or not as discussed in the context of FIGS. 3A and 3B.

The invention is, therefore, advantageous that with respect to other parametric techniques to increase compression efficiency, e.g. noise substitution and noise filling (these techniques are exclusively for efficient representation of noise like local signal content) the invention allows an accurate frequency reproduction of tonal components. To date, no state-of-the-art technique addresses the efficient parametric representation of arbitrary signal content by spectral gap filling without the restriction of a fixed a-priory division in low band (LF) and high band (HF).

Embodiments of the inventive system improve the state-of-the-art approaches and thereby provides high compression efficiency, no or only a small perceptual annoyance and full audio bandwidth even for low bitrates.

The general system consists of full-band core coding intelligent gap filling (tile filling or noise filling)

sparse tonal parts in core selected by tonal mask joint stereo pair coding for full-band, including tile filling TNS on tile spectral whitening in IGF range A first step towards a more efficient system is to remove the need for transforming spectral data into a second transform domain different from the one of the core coder. As the majority of audio codecs, such as AAC for instance, use the MDCT as basic transform, it is useful to perform the BWE in the MDCT domain also. A second requirement for the BWE system would be the need to preserve the tonal grid whereby even HF tonal components are preserved and the quality of the coded audio is thus superior to the existing systems. To take care of both the above mentioned requirements for a BWE scheme, a new system is proposed called Intelligent Gap Filling (IGF). FIG. 2B shows the block diagram of the proposed system on the encoder-side and FIG. 2A shows the system on the decoder-side.

Subsequently, further optional features of the full band frequency domain first encoding processor and the full band frequency domain decoding processor incorporating the gap-filling operation, which can be implemented separately or together are discussed and defined.

Particularly, the spectral domain decoder 112 corresponding to block 1122*a* is configured to output a sequence of decoded frames of spectral values, a decoded frame being the first decoded representation, wherein the frame comprises spectral values for the first set of spectral portions and zero indications for the second spectral portions. The apparatus for decoding furthermore comprises a combiner 208. The spectral values are generated by a frequency regenerator for the second set of second spectral portions, where both, the combiner and the frequency regenerator are included within block 1122*b*. Thus, by combining the second spectral portions and the first spectral portions a reconstructed spectral frame comprising spectral values for the first set of the first spectral portions and the second set of spectral portions are obtained and the spectrum-time converter 118 corresponding to the IMDCT block 1124 in FIG. 14B then converts the reconstructed spectral frame into the time representation.

As outlined, the spectrum-time converter 118 or 1124 is configured to perform an inverse modified discrete cosine transform 512, 514 and further comprises an overlap-add stage 516 for overlapping and adding subsequent time domain frames.

Particularly, the spectral domain audio decoder 1122*a* is configured to generate the first decoded representation so that the first decoded representation has a Nyquist frequency defining a sampling rate being equal to a sampling rate of the time representation generated by the spectrum-time converter 1124.

Furthermore, the decoder 1112 or 1122*a* is configured to generate the first decoded representation so that a first spectral portion 306 is placed with respect to frequency between two second spectral portions 307*a*, 307*b*.

In a further embodiment, a maximum frequency represented by a spectral value for the maximum frequency in the first decoded representation is equal to a maximum frequency included in the time representation generated by the spectrum-time converter, wherein the spectral value for the maximum frequency in the first representation is zero or different from zero.

Furthermore, as illustrated in FIG. 3 the encoded first audio signal portion further comprises an encoded representation of a third set of third spectral portions to be reconstructed by noise filling, and the first decoding processor 1120 additionally includes a noise filler included in block 1122*b* for extracting noise filling information 308 from an encoded representation of the third set of third spectral portions and for applying a noise filling operation in the third set of third spectral portions without using a first spectral portion in a different frequency range.

Furthermore, the spectral domain audio decoder 112 is configured to generate the first decoded representation having the first spectral portions with the frequency values being greater than the frequency being equal to a frequency in the middle of the frequency range covered by the time representation output by the spectrum-time converter 118 or 1124.

Furthermore, the spectral analyzer or full-band analyzer 604 is configured to analyze the representation generated by the time-frequency converter 602 for determining a first set of first spectral portions to be encoded with the first high spectral resolution and the different second set of second spectral portions to be encoded with a second spectral resolution which is lower than the first spectral resolution and, by means of the spectral analyzer, a first spectral portion 306 is determined, with respect to frequency, between two second spectral portions in FIG. 3 at 307*a* and 307*b*.

Particularly, the spectral analyzer is configured for analyzing the spectral representation up to a maximum analysis frequency being at least one quarter of a sampling frequency of the audio signal.

Particularly, the spectral domain audio encoder is configured to process a sequence of frames of spectral values for a quantization and entropy coding, wherein, in a frame, spectral values of the second set of second portions are set to zero, or wherein, in the frame, spectral values of the first set of first spectral portions and the second set of the second spectral portions are present and wherein, during subsequent processing, spectral values in the second set of spectral portions are set to zero as exemplarily illustrated at 410, 418, 422.

The spectral domain audio encoder is configured to generate a spectral representation having a Nyquist frequency defined by the sampling rate of the audio input signal or the first portion of the audio signal processed by the first encoding processor operating in the frequency domain.

The spectral domain audio encoder 606 is furthermore configured to provide the first encoded representation so that, for a frame of a sampled audio signal, the encoded representation comprises the first set of first spectral portions and the second set of second spectral portions, wherein the spectral values in the second set of spectral portions are encoded as zero or noise values.

The full band analyzer 604 or 102 is configured to analyze the spectral representation starting with the gap-filing start frequency 209 and ending with a maximum frequency $f_{max}$ represented by a maximum frequency included in the spectral representation and a spectral portion extending from a minimum frequency up to the gap-filling start frequency 309 belongs to the first set of first spectral portions.

Particularly, the analyzer is configured to apply a tonal mask processing at least of a portion of the spectral representation so that tonal components and non-tonal components are separated from each other, wherein the first set of the first spectral portions comprises the tonal components and wherein the second set of the second spectral portions comprises the non-tonal components.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An audio encoder for encoding an audio signal, the audio signal comprising a first audio signal portion and a timely subsequent second audio signal portion having an audio sampling rate, to generate an encoded audio signal, comprising:

a first encoding processor for encoding the first audio signal portion in a frequency domain to obtain a first encoded signal portion;

a second encoding processor for encoding the second audio signal portion in a time domain to obtain a second encoded signal portion, the second audio signal portion comprising a low band and a high band, wherein the second encoding processor comprises:

a sampling rate converter for converting the second audio signal portion to a lower sampling rate representation of the second audio signal portion, wherein the sampling rate converter is configured so that a lower sampling rate of the lower sampling rate representation is lower than the audio sampling rate of the second audio signal portion, and so that the lower sampling rate representation of the second audio signal portion comprises the low band of the second audio signal portion and does not comprise the high band of the second audio signal portion;

a time domain low band encoder for time domain encoding the lower sampling rate representation of the second audio signal portion; and a time domain bandwidth extension encoder for parametrically encoding the high band of the second audio signal portion;

a controller configured for analyzing a portion of the audio signal and for determining, that the portion of the audio signal is either the first audio signal portion encoded in the frequency domain or the second audio signal portion encoded in the time domain; and an encoded signal former for forming the encoded audio signal comprising the first encoded signal portion for the first audio signal portion and the second encoded signal portion for the second audio signal portion, wherein the audio encoder comprises a cross-processor for calculating, from an encoded spectral representation of the first audio signal portion, initialization data of the second encoding processor, so that the second encoding processor is initialized to encode the second audio signal portion immediately following the first audio signal portion in time in the audio signal, wherein the cross-processor comprises: a spectral decoder for calculating a decoded version of the first encoded signal portion; a delay stage for feeding a delayed version of the decoded version into a de-emphasis stage of the second encoding processor for initialization; a weighted prediction coefficient analysis filtering block for filtering and feeding a filter output into a codebook determinator of the second encoding processor for initialization; an analysis filtering stage for filtering the decoded version or a pre-emphasized version and for feeding a filter residual into an adaptive codebook determinator of the second encoding processor for initialization; or a pre-emphasis filter for filtering the decoded version and for feeding a delayed or pre-emphasized version to a synthesis filtering stage of the second encoding processor for initialization, or wherein the first encoding processor comprises: a time frequency converter for converting the first audio signal portion into a frequency domain representation; an analyzer for analyzing the frequency domain representation to determine first spectral portions to be encoded with a first spectral resolution and second spectral portions to be encoded with a second spectral resolution, the second spectral resolution being lower than the first spectral resolution, wherein the analyzer is configured to determine a first spectral portion from the first spectral portions, the first spectral portion being placed, with respect to frequency, between two second spectral portions from the second spectral portions; and a spectral encoder for encoding the first spectral portions with the first spectral resolution and for encoding the second spectral portions with the second spectral resolution, wherein the spectral encoder comprises a parametric coder for calculating spectral envelope information comprising the second spectral resolution from the second spectral portions.

2. The audio encoder of claim 1, further comprising:

a preprocessor configured for preprocessing the first audio signal portion and the second audio signal portion, wherein the preprocessor comprises:

a prediction analyzer for determining prediction coefficients; and wherein the second encoding processor comprises:

a prediction coefficient quantizer for generating a quantized version of the prediction coefficients; and an entropy coder for generating an encoded version of the quantized prediction coefficients, wherein the encoded signal former is configured for introducing the encoded version of the quantized prediction coefficients into the encoded audio signal.

3. The audio encoder of claim 1, wherein a preprocessor comprises a resampler for resampling the audio signal to the lower sampling rate of the second encoding processor to obtain a resampled audio signal; and wherein a prediction analyzer is configured to determine prediction coefficients using the resampled audio signal, or wherein the preprocessor further comprises a long term prediction analysis stage for determining one or more long term prediction parameters for the first audio signal portion.

4. The audio encoder of claim 1, wherein an analyzer is configured to perform a temporal tile shaping or temporal noise shaping analysis or an operation of setting to zero spectral values in the second spectral portions, wherein the first encoding processor is configured to perform a shaping of spectral values of first spectral portions using prediction coefficients derived from the first audio signal portion, and wherein the first encoding processor is furthermore configured to perform a quantization and entropy coding operation of shaped spectral values of the first spectral portions, and wherein spectral values of the second spectral portions are set to zero.

5. The audio encoder of claim 1, wherein the second encoding processor comprises at least one block of the following group of blocks:

a prediction analysis filter;

an adaptive codebook stage;

an innovative codebook stage;

an estimator for estimating an innovative codebook entry;

an ACELP/gain coding stage;

a prediction synthesis filtering stage;

a de-emphasis stage; and a bass post-filter analysis stage.

6. The audio encoder of claim 1, wherein the time frequency converter is configured for converting the first audio signal portion into the frequency domain representation comprising spectral lines up to a maximum frequency of the first audio signal portion, and wherein the analyzer is configured for analyzing the frequency domain representation up to the maximum frequency.

7. An audio decoder for decoding an encoded audio signal comprising a first encoded audio signal portion and a second encoded audio signal portion to obtain a decoded audio signal, comprising:

a first decoding processor for decoding the first encoded audio signal portion in a frequency domain to obtain a decoded time domain first audio signal portion, wherein the first decoding processor comprises:

a spectral decoder for decoding first spectral portions with a high spectral resolution and for synthesizing second spectral portions using a parametric representation of the second spectral portions and at least a decoded first spectral portion to acquire a decoded spectral representation, wherein the spectral decoder is configured to generate the decoded spectral representation so that a first spectral portion is placed with respect to frequency between two second spectral portions; and a frequency-time converter for converting the decoded spectral representation into a time domain to acquire a decoded time domain first audio signal portion;

a second decoding processor for decoding the second encoded audio signal portion in the time domain to acquire a decoded time domain second audio signal portion having a low band and a high band, wherein the second decoding processor comprises:

a time domain low band decoder for decoding to obtain a low band time domain signal having a first sampling rate;

an upsampler for upsampling the low band time domain signal to obtain an upsampled low band time domain signal having a second sampling rate being higher than the first sampling rate, the upsampled low band time domain signal representing the low band of the decoded time domain second audio signal portion;

a time domain bandwidth extension decoder for synthesizing the high band of the decoded time domain second audio signal portion having the second sampling rate using the low band time domain signal; and a mixer for mixing the high band of the decoded time domain second audio signal portion having the second sampling rate and the upsampled low band time domain signal having the second sampling rate to obtain the decoded time domain second audio signal portion;

a cross-processor for calculating, from a decoded spectral representation of the first encoded audio signal portion, initialization data of the second decoding processor, so that the second decoding processor is initialized to decode the second encoded audio signal portion following in time the first encoded audio signal portion in the encoded audio signal; and a combiner for combining the decoded time domain first audio signal portion and the decoded time domain second audio signal portion to acquire the decoded audio signal.

8. The audio decoder of claim 7, wherein the upsampler comprises an analysis filterbank operating at the first sampling rate and a synthesis filterbank operating at a the second sampling rate.

9. The audio decoder of claim 7, wherein the time domain low band decoder comprises a decoder and a synthesis filter for filtering a residual signal using synthesis filter coefficients, wherein the time domain bandwidth extension decoder is configured to upsample the residual signal to obtain an upsampled residual signal and to process the upsampled residual signal using a non-linear operation to acquire a high band residual signal, and to spectrally shape the high band residual signal to acquire the high band of the decoded time domain second audio signal portion having the second sampling rate.

10. The audio decoder of claim 7, wherein the first decoding processor comprises an adaptive long term prediction post-filter for post-filtering the decoded first audio signal portion, wherein the adaptive long term prediction post-filter is controlled by one or more long term prediction parameters comprised in the encoded audio signal.

11. The audio decoder of claim 7, wherein the second decoding processor comprises at least one block of the group of blocks comprising:

an ACELP for decoding gains and an innovative codebook;

an adaptive codebook synthesis stage;

an ACELP post-processor;

a prediction synthesis filter; and a de-emphasis stage.

12. A method of encoding an audio signal, the audio signal comprising a first audio signal portion and a timely subsequent second audio signal portion having an audio sampling rate, to generate an encoded audio signal, comprising:

first encoding the first audio signal portion in a frequency domain to obtain a first encoded signal portion;

second encoding the second audio signal portion in a time domain to obtain a second encoded signal portion, the second audio signal portion comprising a low band and a high band, wherein the second encoding comprises:

converting the second audio signal portion to a lower sampling rate representation of the second audio signal portion, wherein a lower sampling rate of the lower sampling rate representation is lower than the audio sampling rate of the second audio signal portion, wherein the lower sampling rate representation of the second audio signal portion comprises the low band of the second audio signal portion and does not comprise the high band of the second audio signal portion;

time domain encoding the lower sampling rate representation of the second audio signal portion; and parametrically encoding the high band of second the audio signal portion;

analyzing a portion of the audio signal and determining that the portion of the audio signal is either the first audio signal portion encoded in the frequency domain or is the second audio signal portion encoded in the time domain; and forming the encoded audio signal comprising the first encoded signal portion for the first audio signal portion and the second encoded signal portion for the second audio signal portion, wherein the method of encoding calculating, from an encoded spectral representation of the first audio signal portion, initialization data for the second encoding, so that the second encoding is initialized to encode the second audio signal portion immediately following the first audio signal portion in time in the audio signal, wherein the calculating comprises: calculating a decoded version of the first encoded signal portion; feeding a delayed version of the decoded version into a de-emphasis step of the second encoding for initialization; filtering, using a weighted prediction coefficient analysis filter, and feeding a filter output into a codebook determining step of the second encoding for initialization; analysis filtering the decoded version or a pre-emphasized version and feeding a filter residual into an adaptive codebook determining step of the second encoding for initialization; or pre-emphasis filtering the decoded version and feeding a delayed or pre-emphasized version to a synthesis filtering step of the second encoding for initialization, or wherein the first encoding comprises: time frequency converting the first audio signal portion into a frequency domain representation; analyzing the frequency domain representation to determine first spectral portions to be encoded with a first spectral resolution and second spectral portions to be encoded with a second spectral resolution, the second spectral resolution being lower than the first spectral resolution, wherein the analyzing comprises determining a first spectral portion from the first spectral portions, the first spectral portion being placed, with respect to frequency, between two second spectral portions from the second spectral portions; and encoding the first spectral portions with the first spectral resolution and encoding the second spectral portions with the second spectral resolution, wherein the encoding comprises calculating spectral envelope information comprising the second spectral resolution from the second spectral portions.

13. A method of decoding an encoded audio signal comprising a first encoded audio signal portion and a second encoded audio signal portion to obtain a decoded audio signal, comprising:

first decoding the first encoded audio signal portion in a frequency domain to acquire a decoded time domain first audio signal portion, wherein the first decoding comprises:

decoding first spectral portions with a high spectral resolution and synthesizing second spectral portions using a parametric representation of the second spectral portions and at least a decoded first spectral portion to acquire a decoded spectral representation, wherein the decoding comprises generating the decoded spectral representation so that a first spectral portion is placed with respect to frequency between two second spectral portions; and converting the decoded spectral representation into a time domain to acquire a decoded time domain first audio signal portion;

second decoding the second encoded audio signal portion in the time domain to acquire a decoded second time domain audio signal portion having a low band and a high band, wherein the second decoding comprises:

decoding to obtain a low band time domain signal having a first sampling rate;

upsampling the low band time domain signal to obtain an upsampled low band time domain signal having a second sampling rate being higher than the first sampling rate, the upsampled low band time domain signal representing the low band of the decoded time domain second audio signal portion;

synthesizing the high band of the decoded time domain second audio signal portion having the second sampling rate using the low band time domain signal; and mixing the high band of the decoded time domain second audio signal portion having the second sampling rate and the upsampled low band time domain signal having the second sampling rate to obtain the decoded time domain second audio signal portion;

calculating, from a decoded spectral representation of the first encoded audio signal portion, initialization data of the second decoding, so that the second decoding is initialized to decode the second encoded audio signal portion following in time the first encoded audio signal portion in the encoded audio signal; and combining the decoded time domain first audio signal portion and the decoded time domain second audio signal portion to acquire the decoded audio signal.

14. A non-transitory digital storage medium having stored thereon a computer program for performing, when running on a computer, a method of encoding an audio signal, the audio signal comprising a first audio signal portion and a timely subsequent second audio signal portion having an audio sampling rate, to generate an encoded audio signal, the method comprising:

first encoding the first audio signal portion in a frequency domain to obtain a first encoded signal portion;

second encoding the second audio signal portion in a time domain to obtain a second encoded signal portion, the second audio signal portion comprising a low band and a high band, wherein the second encoding comprises:

converting the second audio signal portion to a lower sampling rate representation of the second audio signal portion, wherein a lower sampling rate of the lower sampling rate representation is lower than the audio sampling rate of the second audio signal portion, wherein the lower sampling rate representation of the second audio signal portion comprises the low band of the second audio signal portion and does not comprise the high band of the second audio signal portion;

time domain encoding the lower sampling rate representation of the second audio signal portion; and parametrically encoding the high band of the second audio signal portion;

analyzing a portion of the audio signal and determining that the portion of the audio signal is either the first audio signal portion encoded in the frequency domain or the second audio signal portion encoded in the time domain; and forming the encoded audio signal comprising the first encoded signal portion for the first audio signal portion and the second encoded signal portion for the second audio signal portion, wherein the method of encoding calculating, from an encoded spectral representation of the first audio signal portion, initialization data for the second encoding, so that the second encoding is initialized to encode the second audio signal portion immediately following the first audio signal portion in time in the audio signal, wherein the calculating comprises: calculating a decoded version of the first encoded signal portion; feeding a delayed version of the decoded version into a de-emphasis step of the second encoding for initialization; filtering, using a weighted prediction coefficient analysis filter, and feeding a filter output into a codebook determining step of the second encoding for initialization; analysis filtering the decoded version or a pre-emphasized version and feeding a filter residual into an adaptive codebook determining step of the second encoding for initialization; or pre-emphasis filtering the decoded version and feeding a delayed or pre-emphasized version to a synthesis filtering step of the second encoding for initialization, or wherein the first encoding comprises: time frequency converting the first audio signal portion into a frequency domain representation; analyzing the frequency domain representation to determine first spectral portions to be encoded with a first spectral resolution and second spectral portions to be encoded with a second spectral resolution, the second spectral resolution being lower than the first spectral resolution, wherein the analyzing comprises determining a first spectral portion from the first spectral portions, the first spectral portion being placed, with respect to frequency, between two second spectral portions from the second spectral portions; and encoding the first spectral portions with the first spectral resolution and encoding the second spectral portions with the second spectral resolution, wherein the encoding comprises calculating spectral envelope information comprising the second spectral resolution from the second spectral portions.

15. A non-transitory digital storage medium having stored thereon a computer program for performing, when running on a computer, a method of decoding an encoded audio signal comprising a first encoded audio signal portion and a second encoded audio signal portion to obtain a decoded audio signal, the method comprising:

first decoding the first encoded audio signal portion in a frequency domain to acquire a decoded time domain first audio signal portion, wherein the first decoding comprises:

decoding first spectral portions with a high spectral resolution and synthesizing second spectral portions using a parametric representation of the second spectral portions and at least a decoded first spectral portion to acquire a decoded spectral representation, wherein the decoding comprises generating the decoded spectral representation so that a first spectral portion is placed with respect to frequency between two second spectral portions; and converting the decoded spectral representation into a time domain to acquire a decoded time domain first audio signal portion;

second decoding the second encoded audio signal portion in the time domain to acquire a decoded time domain second audio signal portion having a low band and a high band, wherein the second decoding comprises:

decoding to obtain a low band time domain signal having a first sampling rate;

upsampling the low band time domain signal to obtain an upsampled low band time domain signal having a second sampling rate being higher than the first sampling rate, the upsampled low band time domain signal representing the low band of the decoded time domain second audio signal portion;

synthesizing the high band of the decoded time domain second audio signal portion having the second sampling rate using the low band time domain signal; and mixing the high band of the decoded time domain second audio signal portion having the second sampling rate and the upsampled low band time domain signal having the second sampling rate to obtain the decoded time domain second audio signal portion;

calculating, from a decoded spectral representation of the first encoded audio signal portion, initialization data of the second decoding, so that the second decoding is initialized to decode the second encoded audio signal portion following in time the first encoded audio signal portion in the encoded audio signal; and combining the decoded time domain first audio signal portion and the decoded time domain second audio signal portion to acquire the decoded audio signal.

16. An audio decoder for decoding an encoded audio signal comprising a first encoded audio signal portion and a second encoded audio signal portion to obtain a decoded audio signal, comprising:

a first decoding processor for decoding the first encoded audio signal portion in a frequency domain to obtain a decoded time domain first audio signal portion, wherein the first decoding processor comprises:

a spectral decoder for decoding first spectral portions with a high spectral resolution and for synthesizing second spectral portions using a parametric representation of the second spectral portions and at least a decoded first spectral portion to acquire a decoded spectral representation, and a frequency-time converter for converting the decoded spectral representation into a time domain to acquire the decoded time domain first audio signal portion having a third sampling rate;

a second decoding processor for decoding the second encoded audio signal portion in the time domain to acquire a decoded time domain second audio signal portion having a low band and a high band, wherein the second decoding processor comprises:

a time domain low band decoder for decoding to obtain a low band time domain signal having a first sampling rate, wherein the first sampling is lower than the third sampling rate;

an upsampler for upsampling the low band time domain signal to obtain an upsampled low band time domain signal having a second sampling rate being higher than the first sampling rate, the upsampled low band time domain signal representing the low band of the decoded time domain second audio signal portion;

a time domain bandwidth extension decoder for synthesizing the high band of the decoded time domain second audio signal portion having the second sampling rate using the low band time domain signal; and a mixer for mixing the high band of the decoded time domain second audio signal portion having the second sampling rate and the upsampled low band time domain signal having the second sampling rate to obtain the decoded time domain second audio signal portion; and a combiner for combining the decoded time domain first audio signal portion and the decoded time domain second audio signal portion to acquire the decoded audio signal.

17. A method of decoding an encoded audio signal comprising a first encoded audio signal portion and a second encoded audio signal portion to obtain a decoded audio signal, comprising:

first decoding the first encoded audio signal portion in a frequency domain to acquire a decoded time domain first audio signal portion, wherein the first decoding comprises:

decoding first spectral portions with a high spectral resolution and synthesizing second spectral portions using a parametric representation of the second spectral portions and at least a decoded first spectral portion to acquire a decoded spectral representation; and converting the decoded spectral representation into a time domain to acquire the decoded time domain first audio signal portion having a third sampling rate;

second decoding the second encoded audio signal portion in the time domain to acquire a decoded second time domain audio signal portion having a low band and a high band, wherein the second decoding comprises:

decoding to obtain a low band time domain signal having a first sampling rate wherein the first sampling is lower than the third sampling rate;

upsampling the low band time domain signal to obtain an upsampled low band time domain signal having a second sampling rate being higher than the first sampling rate, the upsampled low band time domain signal representing the low band of the decoded time domain second audio signal portion;

synthesizing the high band of the decoded time domain second audio signal portion having the second sampling rate using the low band time domain signal; and mixing the high band of the decoded time domain second audio signal portion having the second sampling rate and the upsampled low band time domain signal having the second sampling rate to obtain the decoded time domain second audio signal portion; and combining the decoded time domain first audio signal portion and the decoded time domain second audio signal portion to acquire the decoded audio signal.

18. A non-transitory digital storage medium having stored thereon a computer program for performing, when running on a computer, a method of decoding an encoded audio signal comprising a first encoded audio signal portion and a second encoded audio signal portion to obtain a decoded audio signal, the method comprising:

first decoding the first encoded audio signal portion in a frequency domain to acquire a decoded time domain first audio signal portion, wherein the first decoding comprises:

decoding first spectral portions with a high spectral resolution and synthesizing second spectral portions using a parametric representation of the second spectral portions and at least a decoded first spectral portion to acquire a decoded spectral representation; and converting the decoded spectral representation into a time domain to acquire the decoded time domain first audio signal portion having a third sampling rate;

second decoding the second encoded audio signal portion in the time domain to acquire a decoded time domain second audio signal portion having a low band and a high band, wherein the second decoding comprises:

decoding to obtain a low band time domain signal having a first sampling rate wherein the first sampling is lower than the third sampling rate;

upsampling the low band time domain signal to obtain an upsampled low band time domain signal having a second sampling rate being higher than the first sampling rate, the upsampled low band time domain signal representing the low band of the decoded time domain second audio signal portion;

synthesizing the high band of the decoded time domain second audio signal portion having the second sampling rate using the low band time domain signal; and mixing the high band of the decoded time domain second audio signal portion having the second sampling rate and the upsampled low band time domain signal having the second sampling rate to obtain the decoded time domain second audio signal portion; and combining the decoded time domain first audio signal portion and the decoded time domain second audio signal portion to acquire the decoded audio signal.

* * * * *